United States Patent [19]

Yamada et al.

[11] Patent Number: 5,583,675
[45] Date of Patent: Dec. 10, 1996

[54] LIQUID CRYSTAL DISPLAY DEVICE AND A METHOD FOR PRODUCING THE SAME

[75] Inventors: Nobuaki Yamada, Higashiosaka; Masahiko Kondo, Kitakatsuragi-gun; Shuichi Kohzaki, Nara; Makoto Ohue, Tenri; Shinji Shimada, Kashihara; Masahiro Adachi, Nara all of Japan

[73] Assignee: Sharp Kabushiki Kaisha, Osaka, Japan

[21] Appl. No.: 243,266

[22] Filed: May 16, 1994

Related U.S. Application Data

[63] Continuation-in-part of Ser. No. 54,454, Apr. 27, 1993, Pat. No. 5,473,450.

[30] Foreign Application Priority Data

| May 17, 1993 | [JP] | Japan | 5-115064 |
| Oct. 8, 1993 | [JP] | Japan | 5-253452 |
| Dec. 28, 1993 | [JP] | Japan | 5-349924 |

[51] Int. Cl.⁶ .......................... G02F 1/1335; G02F 1/13; G02F 1/1339

[52] U.S. Cl. ............... 349/84; 349/86; 349/106; 349/110; 349/155

[58] Field of Search .................. 359/51, 62, 67, 359/68, 81

[56] References Cited

U.S. PATENT DOCUMENTS

| 4,596,445 | 6/1986 | Fergason | 350/339 F |
| 4,662,720 | 5/1987 | Fergason | 350/339 F |
| 5,320,920 | 7/1994 | Isoda et al. | 430/7 |
| 5,333,074 | 7/1994 | Hikmet | 359/51 |
| 5,357,357 | 10/1994 | Imazeki et al. | 359/76 |
| 5,365,357 | 11/1994 | Ohgawara et al. | 359/67 |
| 5,418,094 | 5/1995 | Sato et al. | 359/68 |

FOREIGN PATENT DOCUMENTS

| 56-140321 | 11/1981 | Japan . |
| 58-501631 | 9/1983 | Japan . |
| 59-226322 | 12/1984 | Japan . |
| 61-502128 | 9/1986 | Japan . |
| 1-269922 | 10/1989 | Japan . |
| 2-99920 | 4/1990 | Japan . |
| 2-153318 | 6/1990 | Japan . |
| 2-153319 | 6/1990 | Japan . |
| 3-61925 | 3/1991 | Japan . |
| 3-278024 | 12/1991 | Japan . |
| 4-31823 | 2/1992 | Japan . |
| 4-31824 | 2/1992 | Japan . |
| 4-212928 | 8/1992 | Japan . |
| 4-338923 | 11/1992 | Japan . |
| 5-11237 | 1/1993 | Japan . |
| 5-27242 | 2/1993 | Japan . |
| WO83/01016 | 3/1983 | WIPO . |
| WO85/04262 | 9/1985 | WIPO . |

OTHER PUBLICATIONS

Yoshida et al, Japan Display '92, "A Full–Color TFT–LCD with a Polymer–Dispersed Structure", Oct. 1992.
Yamanaka et al, SID 92 DIGEST, "Integrated Black Matrix on TFT Arrays", May 1992, pp. 789–792.

*Primary Examiner*—Wael M. Fahmy
*Assistant Examiner*—Fetsum Abraham
*Attorney, Agent, or Firm*—Nixon & Vanderhye P.C.

[57] ABSTRACT

A liquid crystal display device includes a pair of substrates opposed to each other; a plurality of pixels for realizing display; and a liquid crystal layer interposed between the substrates and including a liquid crystal region corresponding to each of the pixels, the liquid crystal regions being surrounded by a polymer wall. At least one of the substrates is transparent and includes thereon an optical element for adjusting a transmittance of light therethrough. The optical element corresponds to each of the pixels. The optical element has a transmittance of no greater than 50% with respect to light of at least one wavelength in the range of 250 to 400 nm and has a maximum transmittance of at least 20% with respect to light of a wavelength of more than 400 nm.

22 Claims, 16 Drawing Sheets

FIG. 7
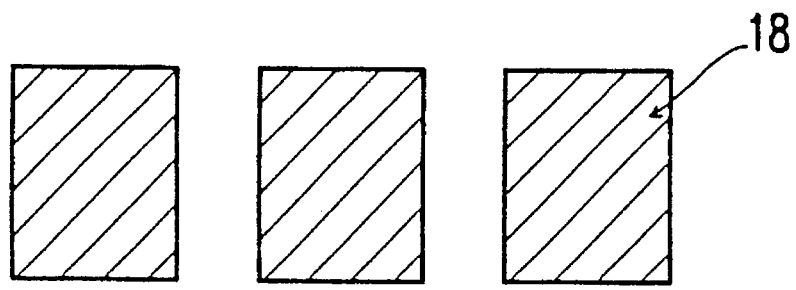
FIG. 8
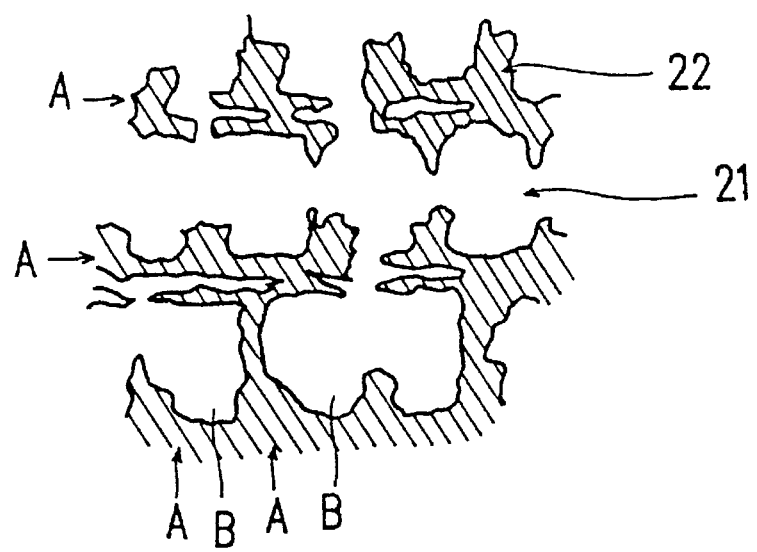
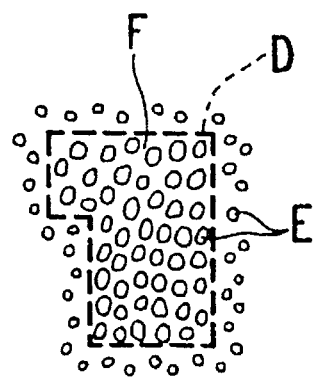
FIG. 9

FIG. 14
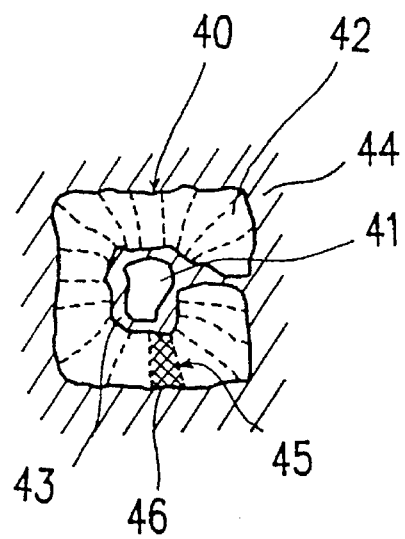
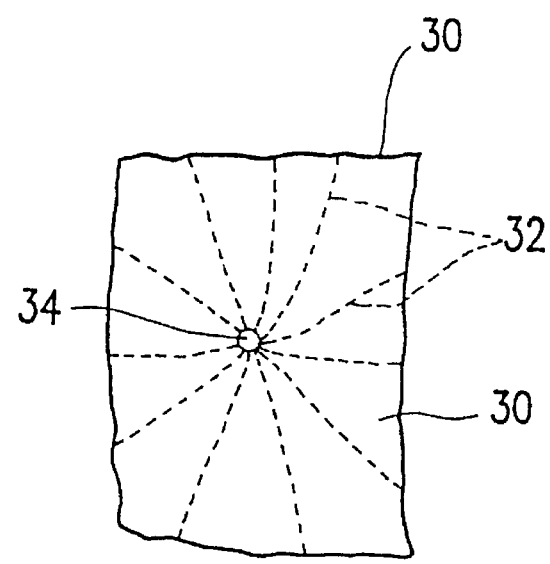
FIG. 15

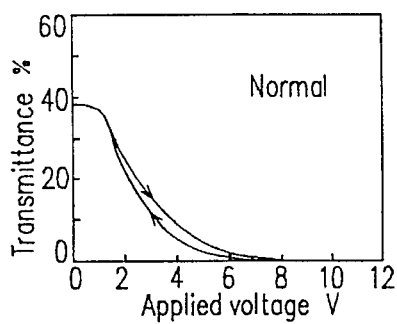
FIG. 20(a)
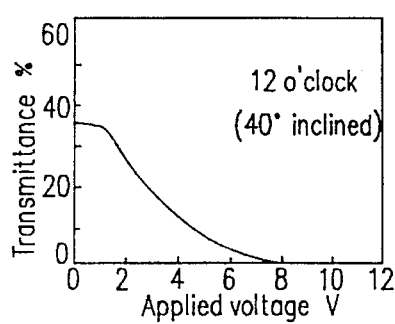
FIG. 20(b)
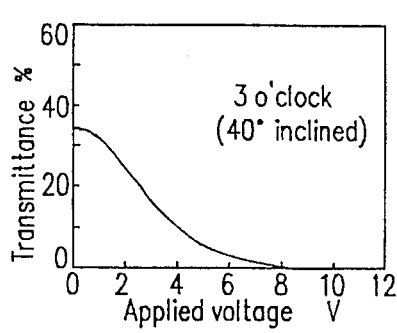
FIG. 20(c)
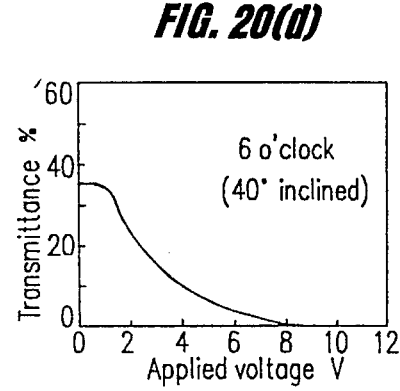
FIG. 20(d)
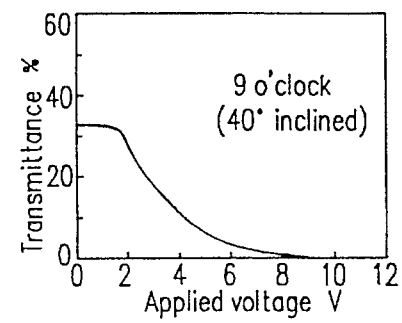
FIG. 20(e)
FIG. 20(f)
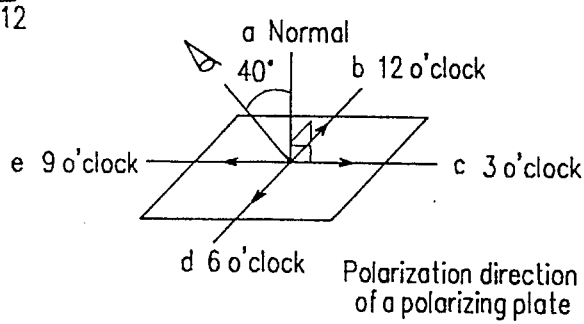

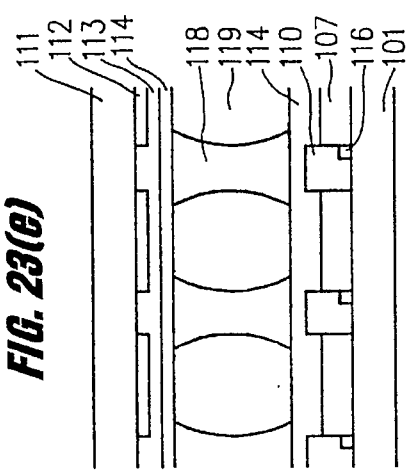
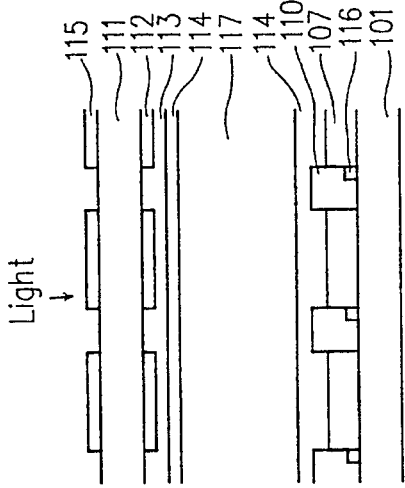
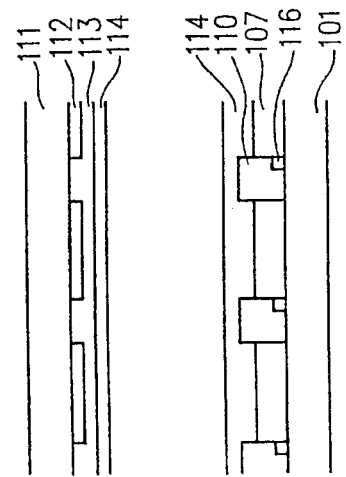
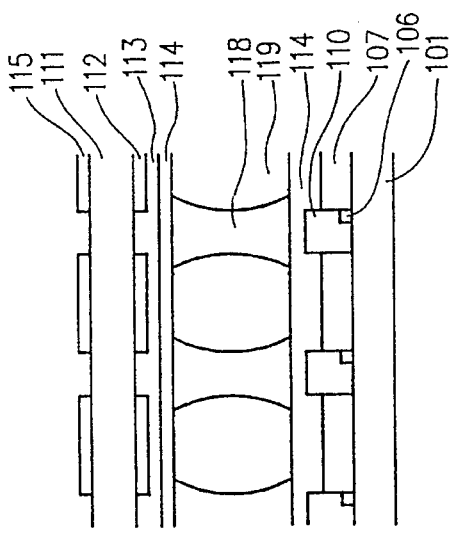
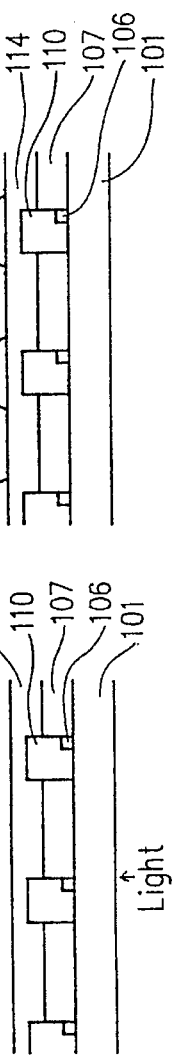

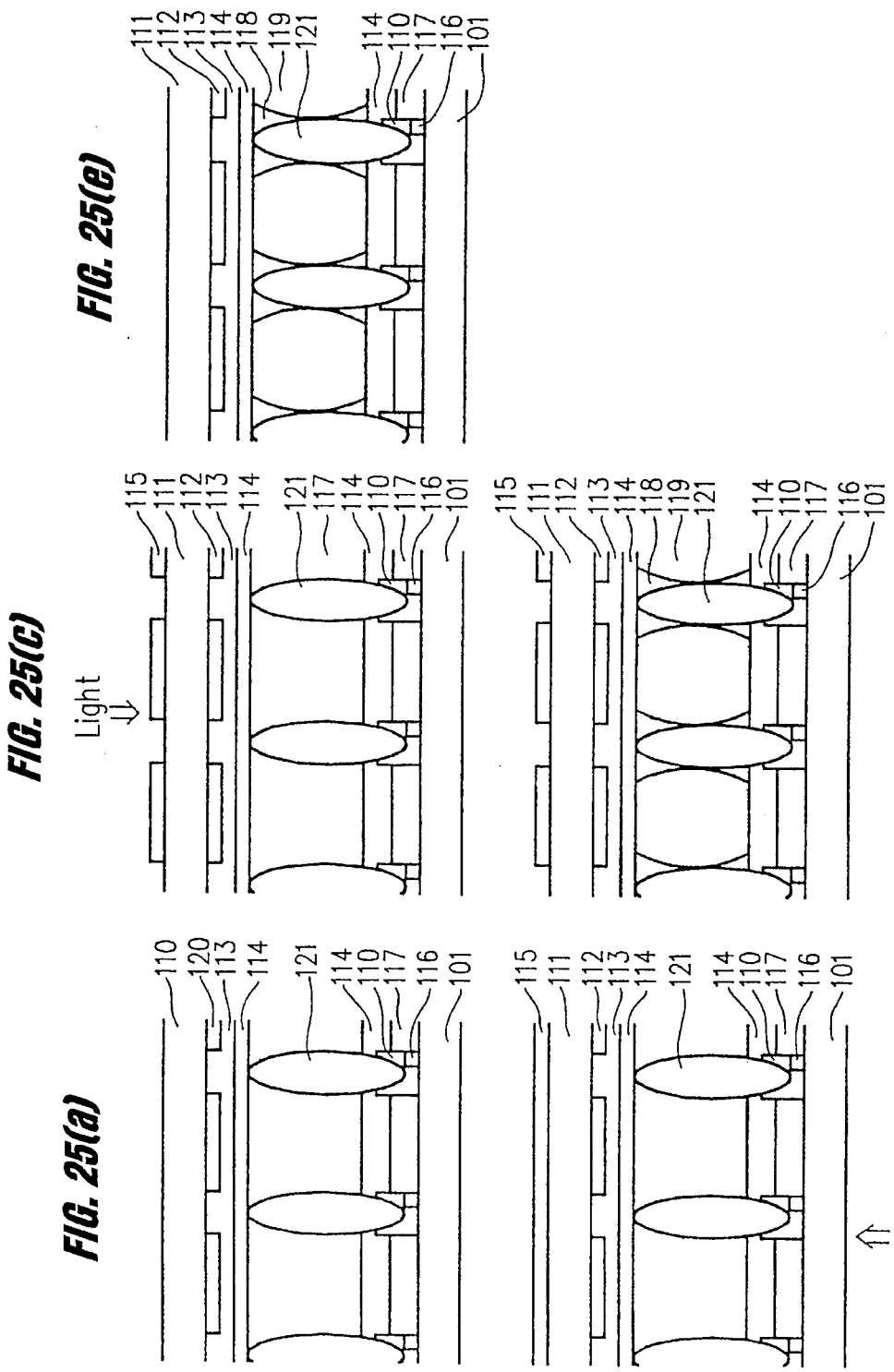

LIQUID CRYSTAL DISPLAY DEVICE AND A METHOD FOR PRODUCING THE SAME

This is a continuation-in-part of application Ser. No. 08/054,454 filed Apr. 27, 1993, now U.S. Pat. No. 5,473,450, issued on Dec. 5, 1995.

BACKGROUND OF THE INVENTION

1. Field of the Invention

The present invention relates to a liquid crystal display device and a method for producing the same, and in particular, to a liquid crystal display device having an improved viewing angle characteristic and a method for producing the same.

2. Description of the Related Art

Conventionally, liquid crystal display (hereinafter, referred to as "LCD") devices using an electro-optical effect are known. The different types of LCD devices which have been put into practical use include, for example, twisted nematic LCD devices and super twisted nematic LCD devices, both of which use a nematic liquid crystal material. Hereinafter, twisted nematic LCD devices will be referred to as "TN LCD devices", and super twisted nematic LCD devices will be referred to as "STN LCD devices". LCD devices using a ferroelectric liquid crystal have also been proposed.

The above-mentioned LCD devices require a polarizing plate and some type of alignment treatment. In the initial state, the liquid crystal molecules are tilted at a pre-tilt angle in a uniform alignment direction while being twisted at an angle of 90° in a liquid crystal layer. The liquid crystal molecules are treated using an alignment layer or the like so as to be erected in a uniform direction when a voltage of a prescribed level is applied. When such a voltage is applied as to display a half-tone image, the liquid crystal molecules are tilted at a certain angle in a uniform direction. Due to the tilting in the uniform direction and the birefringence of the liquid crystal material, the refractive index of the liquid crystal molecules is different when the liquid crystal molecules are seen from different directions. Due to the different refractive indices, the contrast of the image is significantly different depending on the direction from which the image is seen. In an extreme case, a defective display can occur such as display inversion in which the contrast of the displayed image is inverted. Thus, conventional LCD devices suffer from such drawbacks as a poor viewing angle characteristic.

Other types of LCD devices, which do not require polarizing plates, make use of a dynamic scattering (DS) effect or a phase change (PC) effect of a liquid crystal material.

Japanese Laid-Open Patent Publication No. 61-502128 describes still another type of LCD device which does not include a polarizing plate. This type of LCD device does not require alignment treatment either, and utilizes the birefringence of the liquid crystal to control the liquid crystal to be in a transparent state or an opaque state. Such an LCD device is basically operated in the following manner. A liquid crystal layer within the LCD device includes a liquid crystal and a polymer. The ordinary refractive index of the liquid crystal molecules and the refractive index of a polymer used as a surrounding are matched. Thus, when a voltage is applied to align the orientation directions of the liquid crystal molecules of the LCD device in the direction of the electric field, the liquid crystal layer is put into a transparent state to transmit light. When no voltage is applied, the orientation directions of the liquid crystal molecules are not uniform, namely, the liquid crystal layer is in an opaque state as a result of scattering the light. According to one known production method, such LCD devices are produced by mixing a photocurable resin or a thermosetting resin with a liquid crystal material and curing the resultant mixture to separate a liquid crystal phase from a polymer phase, thereby forming liquid crystal regions in the resin.

Japanese Laid-Open Patent Publication Nos. 4-338923 and 4-212928 describe a method for improving the viewing angle characteristic of a TN LCD device including a thin film transistor (hereinafter, referred to as the "TFT"). According to these publications, an LCD device to transmit the light in a transparent state or scatter the light in an opaque state includes a liquid crystal layer interposed between two polarizing plates, the polarizing axes of which are perpendicular to each other. In the method described in the above-mentioned publications, the light which is polarized by one of the polarizing plates is depolarized by the liquid crystal layer in the light scattering state. In principle, the brightness of the light incident on the LCD device is reduced down to 50% at least. In practice, the brightness of the light transmitted through this type of LCD devices is ⅓ of that transmitted through usual TN LCD devices (H. Yoshida, M. Ohashi and M. Okabe, Japan Display 1992, S-17, page 631).

Japanese Laid-Open Patent Publication No. 5-27242 describes another method for improving the viewing angle characteristic of a TN LCD device, in which a liquid crystal layer includes a plurality of liquid crystal regions separated from one another by a polymer wall. Each liquid crystal region includes a plurality of liquid crystal domains randomly arranged. The uniform arrangement of the liquid crystal domains is disturbed by the polymer wall, and thus the liquid crystal domains are put into a random state, thereby improving the viewing angle characteristic. However, in this method, the liquid crystal regions cannot be formed in areas accurately corresponding to a plurality of pixels arranged in a matrix. Because of this drawback, the transmittance of the light through the LCD device still suffers. Further, when the liquid crystal domains are arranged randomly, extreme deterioration, such as inversion, in the viewing angle characteristic does not occur. Nevertheless, there is still substantial light leakage in the LCD device when measured at an angle that is offset from a direction perpendicular to the substrate of the LCD device even during voltage saturation when ideally no light is transmitted.

In order to solve the above-described problems, researchers including some of the inventors of the present invention proposed another type of LCD device in Japanese Patent Application No. 5-30996. The LCD device described in this patent application includes a pair of substrates opposed to each other and a mixture of a liquid crystal, a photocurable resin and a photo-initiator injected between the substrates. A photomask is provided on a counter substrate included among the two substrates to substantially shield light from areas of the mixture corresponding to a plurality of pixels. When ultraviolet rays are radiated on the mixture from the side of the photomask, liquid crystal regions are formed in the areas in the mixture corresponding to the pixels, the areas being exposed to a very low intensity of the ultraviolet rays. The polymer aggregates in the other areas, namely, the areas which are not corresponding to the pixels and exposed to a high intensity of the ultraviolet rays. In such an LCD device, liquid crystal regions can be formed in areas corresponding to the pixels due to the photomask. In the case when, for example, a nematic liquid crystal is used to arrange the liquid crystal domains radially or randomly in the liquid crystal region, the viewing angle characteristic of the LCD device is significantly improved compared with that of usual TN LCD devices.

However, in the case when the counter substrate is also covered with a black mask having light transmitting holes at positions corresponding to the pixels, the ultraviolet rays are not transmitted through a sufficiently large portion of the LCD device to easily cure the photocurable resin.

In the case when the counter substrate having the photomask is also covered with a color filter, the ultraviolet rays are not transmitted through the color filter, and thus it is more difficult to cure the photocurable resin.

In order to avoid such problems, the photomask is provided on an active substrate opposed to the counter substrate, and the ultraviolet rays are radiated from the side of the active substrate through the photomask. However, since source lines and gate lines provided on the active substrate shield the ultraviolet rays, liquid crystal regions are formed below the source lines and the gate lines as well as in areas corresponding to the pixels. The formation of the liquid crystal regions below the source lines and the gate lines effects the composition of the liquid crystal material and polymer in the liquid crystal layer. More particularly, the polymer tends to remain in the areas corresponding to the pixels, and the liquid crystal regions formed below the source lines and the gate lines contact the liquid crystal regions formed in the areas corresponding to the pixels. As a result, the arrangement of the liquid crystal domains in the liquid crystal regions formed in the areas corresponding to the pixels is adversely affected, thereby reducing the viewing angle characteristic of the LCD device.

SUMMARY OF THE INVENTION

A liquid crystal display device according to the present invention includes a pair of substrates opposed to each other; a plurality of pixels for realizing display; and a liquid crystal layer interposed between the substrates and including a liquid crystal region corresponding to each of the pixels, the liquid crystal regions being surrounded by a polymer wall. At least one of the substrates is transparent and includes thereon an optical element for adjusting a transmittance of light therethrough, the optical element corresponding to each of the pixels. The optical element has a transmittance of no greater than 50% with respect to light of at least one wavelength in the range of 250 to 400 nm and has a maximum transmittance of at least 20% with respect to light of a wavelength of more than 400 nm.

In one embodiment of the invention, the liquid crystal display device further includes another optical element included in the transparent substrate having the optical element. The another optical element includes a light transmitting area and a light shielding area, and the light shielding area shields at least a portion of an area of the liquid crystal display device excluding the pixels.

In one embodiment of the invention, the optical element is a color filter.

In one embodiment of the invention, the liquid crystal display device further includes a polarizing plate on a surface of at least one of the substrates, the surface being opposite to a surface facing the liquid crystal layer.

In one embodiment of the invention, the liquid crystal display device further includes an alignment film on a surface of at least one of the substrates, the surface facing the liquid crystal layer.

In one embodiment of the invention, the alignment film includes a polycrystal.

In one embodiment of the invention, the substrate opposed to the transparent substrate having the another optical element includes a light shielding element for shielding light transmitted through the light transmitting area of the another optical element.

In one embodiment of the invention, the light shielding element includes at least one of a signal line and a scanning line.

In one embodiment of the invention, the optical element is formed of a polymer material which substantially allows visible light to transmit therethrough.

In one embodiment of the invention, the optical element is formed of a thin film including an optical portion for substantially shielding light of a wavelength range of 250 to 400 nm.

In one embodiment of the invention, the optical portion includes a light absorber for selectively absorbing the light of the wavelength range of 250 to 400 nm.

Alternatively, a liquid crystal display device according to the present invention includes a pair of substrates opposed to each other; a plurality of pixels for realizing display; and a liquid crystal layer interposed between the substrates and including a liquid crystal region corresponding to each of the pixels, the liquid crystal regions being surrounded by a polymer wall. The liquid crystal region includes at least one liquid crystal domain having liquid crystal molecules radially arranged. One of the substrates includes a light shielding element in an area excluding the pixels, and areas on the other substrate corresponding to the pixels are transparent.

In one embodiment of the invention, the light shielding element is formed of a resin material including a spacer mixed therein.

In one embodiment of the invention, the light shielding element is formed of a resin material including a black filler mixed therein.

In one embodiment of the invention, the liquid crystal display device further includes a switching device for controlling the display realized by the pixels.

In another aspect of the invention, a method for producing a liquid crystal display device including two substrates opposed to each other, at least one of which is transparent; a plurality of pixels for realizing display; and a liquid crystal layer interposed between the substrates and including a liquid crystal region corresponding to each of the pixels, the liquid crystal regions being surrounded by a polymer wall, includes the steps of forming, on a surface of the transparent substrate, an optical element for adjusting a transmittance of light therethrough, the optical element having a transmittance of no greater than 50% with respect to light of at least one wavelength in the range of 250 to 400 nm and a maximum transmittance of at least 20% with respect to light of a wavelength of more than 400 nm; assembling the two substrates together, with the surface of the substrate provided with the optical element being inside; injecting a mixture of a liquid crystal material and a photocurable resin between the two substrates to form the liquid crystal layer; and radiating light of the at least one wavelength toward the assembly of the two substrates including the liquid crystal layer from the side of the transparent substrate provided with the optical element, thereby forming a liquid crystal region corresponding to each of the pixels surrounded by the polymer wall in the liquid crystal layer.

In one embodiment of the invention, the optical element includes a light absorber.

Alternatively, a method for producing a liquid crystal display device including two substrates opposed to each other, at least one of which is transparent; a plurality of pixels for realizing display; and a liquid crystal layer interposed between the substrates and including a liquid crystal region corresponding to each of the pixels, the liquid crystal regions being surrounded by a polymer wall includes the steps of forming, on a surface of the transparent substrate, an optical element for adjusting a transmittance of light therethrough in a pattern, the optical element having a transmittance of no greater than 50% with respect to light of at least one wavelength in the range of 250 to 400 nm and a maximum transmittance of at least 20% with respect to light of a wavelength of more than 400 nm; forming a photosensitive resin layer on a surface of the substrate excluding the optical element; assembling the two substrates together, with the surface of the substrate provided with the optical element and the surface of the substrate excluding the photosensitive resin layer being inside; radiating light of the at least one wavelength toward the photosensitive resin layer from the side of the substrate including the optical element, using the optical element as a photomask to form the photosensitive resin layer into a pattern; injecting a mixture of a liquid crystal material and a photocurable resin between the two substrates to form the liquid crystal layer; and radiating light toward the assembly of the two substrates including the liquid crystal layer from the side of the substrate including the photosensitive resin layer, thereby forming a liquid crystal region corresponding to each of the pixels surrounded by the polymer wall in the liquid crystal layer.

In a liquid crystal display device according to the present invention, at least one of two substrates is transparent, and the transparent substrate includes an optical element having a transmittance of no greater than 50% with respect to light of at least one wavelength in the range of 250 to 400 nm and having a maximum transmittance of at least 20% with respect to light of a wavelength in the range of more than 400 nm. The optical element is provided in correspondence with the pixels. The transparent substrate also includes another optical element having a light transmitting area and a light shielding area for shielding light against at least a part of an area other than areas corresponding to the pixels. Due to such structure, when a mixture including a liquid crystal material and a photocurable resin is injected between the two substrates to form a liquid crystal layer, and light having a wavelength of, for example, 400 nm or less is radiated from the side of the transparent substrate including the optical elements, the light is transmitted through the light transmitting area of the another optical element and reaches the mixture. Therefore, photopolymerization of the photocurable resin occurs in the area other than the areas corresponding to the pixels. As a result, the liquid crystal material exists in areas corresponding to the pixels not exposed or barely exposed to the light, and a polymer material exists in the other areas exposed to a high intensity of light. In this state, the liquid crystal regions are surrounded by a polymer wall in the liquid crystal layer.

Since the optical element provided in correspondence with the pixels easily allows transmission of light having a wavelength of 400 nm or more, a satisfactory display is obtained.

In a method for producing a liquid crystal display device according to the present invention, a mixture of a liquid crystal material and a photocurable resin is injected between two substrates, at least one of which is transparent, and then an optical element is used as a photomask to perform phase separation so that a liquid crystal phase is formed in an area corresponding to the pixels and a polymer phase is formed in the other areas. Accordingly, when a voltage is applied, the liquid crystal molecules are radially erected. In this state, the apparent refractive indices of the liquid crystal molecules are approximately the same when seen in any direction, thus significantly improving the viewing angle characteristic of the liquid crystal display device.

Alternatively, before the injection of the mixture, an optical element for adjusting the light transmittance is provided on one of the substrates in an area not corresponding to the pixels, and a photosensitive resin layer is formed on a surface of the same substrate, the substrate not having the optical element. In this state, light is radiated to the liquid crystal cell from the side of the other substrate using the optical element as a mask, thereby patterning the photosensitive resin layer. After injecting the mixture, the liquid crystal cell is exposed to light using the patterned photosensitive resin layer as a mask. As a result, the phase separation occurs by self-alignment. Therefore, the resultant liquid crystal display device has highly precise positioning. Although a light shielding layer formed of a resin provided in a liquid crystal display device including TFTs is described in Japanese Laid-Open Patent Publication No. 56-140321 and H. Yamanaka, T. Fukunaga, T. Koseki, K. Nagayama and T. Ueoki, SID 1992 DIGEST pp. 789–792, use of the light shielding layer for patterning a film formed on an outer surface of the substrate is not described.

Thus, the invention described herein makes possible the advantages of providing an LCD device having a liquid crystal region in an area corresponding to a pixel and a method for easily producing such an LCD device by light radiation from the side of a substrate without using a photomask, even if the substrate is provided with a black mask or a color filter.

These and other advantages of the present invention will become apparent to those skilled in the art upon reading and understanding the following detailed description with reference to the accompanying figures.

BRIEF DESCRIPTION OF THE DRAWINGS

FIG. 7 is a plan view of a photomask used in the second example;

FIG. 8 is a schematic view illustrating a part of a liquid crystal layer after removing a liquid crystal in the second example observed by a scanning electron microscope;

FIG. 9 is a plan view of a part of a liquid crystal layer obtained in a third example;

FIG. 14 is a schematic view of a liquid crystal region obtain by low-rate photopolymerization;

FIG. 15 is a schematic view of a liquid crystal region obtain by photopolymerization using a by color filter having a light transmitting hole;

FIGS. 20(a) through 20(e) are graphs illustrating the viewing angle characteristics of the LCD device in the sixth example obtained at different viewing angles, and FIG. 20(f) is a geometric diagram illustrating the viewing angles;

FIGS. 23(a) through 23(e) is a schematic illustration illustrating production steps of the LCD device in the eighth example;

FIGS. 25(a through 25(e) is a schematic illustration illustrating production steps of the LCD device in the ninth example.

DESCRIPTION OF THE PREFERRED EMBODIMENTS

Hereinafter, the present invention will be described by way of illustrative examples with reference to the accompanying drawings.

EXAMPLE 1

Referring initially to FIGS. 1 through 4 and 17, a first example according to the present invention will be described.

Figure 1:
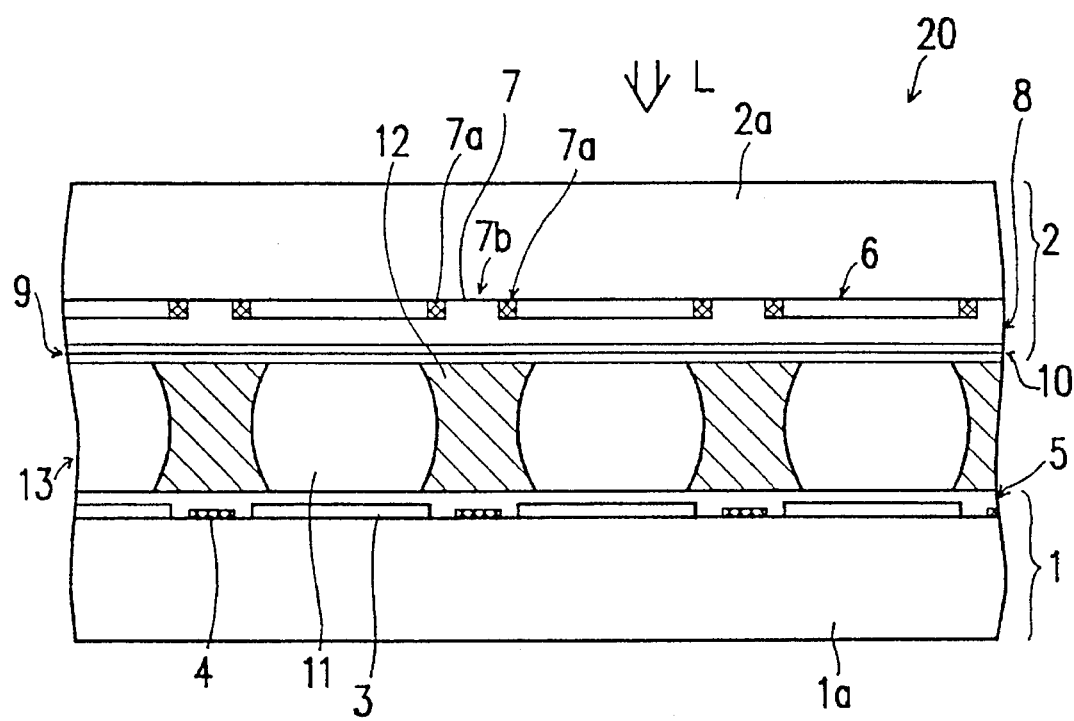
FIG. 1 is a cross sectional view of an LCD device in a first example according to the present invention.

FIG. 1 is a cross sectional view of an LCD device 20 in accordance with the first example. As is illustrated in FIG. 1, the LCD device 20 includes a TFT substrate 1 and a counter substrate 2 positioned opposite to the TFT substrate 1. A liquid crystal layer 13 is located between the TFT substrate 1 and the counter substrate 2. In the liquid crystal layer 13, a plurality of liquid crystal regions 11 are surrounded by a polymer wall 12. The TFT substrate 1 includes a glass base plate 1a. A plurality of pixel electrodes 3 are provided in a matrix on a surface of the base plate 1a on the side of the liquid crystal layer 13. A plurality of bus lines 4 are provided in a lattice arrangement between two adjacent pixel electrodes 3 on the surface of the base plate 1a. The bus lines 4 serve to shield visible light and ultraviolet rays. The bus lines 4 include source bus lines running parallel to each other and gate bus lines running parallel to each other and perpendicular to the source bus lines. The pixel electrodes 3 are connected to a corresponding source bus line and gate bus line via a TFT (not shown) provided for each of the pixel electrodes 3. An external signal is sent to the pixel electrode 3 through the TFT via the source bus line based on a gate control signal delivered to the gate bus line connected to the pixel electrode 3. An alignment film 5 is provided on the surface of the base plate 1a, covering the pixel electrodes 3, the bus lines 4, and the TFTs. The alignment film 5 can be omitted.

The counter substrate 2 includes a glass base plate 2a. On a surface of the base plate 2a on the side of the liquid crystal layer 13, a black mask 7 is provided in an area not corresponding to the pixel electrodes 3 (e.g., in the area opposite the space between the pixel electrodes 3). Color filters 6 are provided in areas which are not provided with the black mask 7. The black mask 7 may be provided not only in an area not corresponding to the pixel electrodes 3, but also a part of an area corresponding to each pixel electrode 3. Although the black mask 7 is not necessary, the TFTs are preferably covered in order to prevent deterioration. A "pixel" is defined by an area of each pixel electrode 3 which corresponds to the color filter 6.

Figure 2:
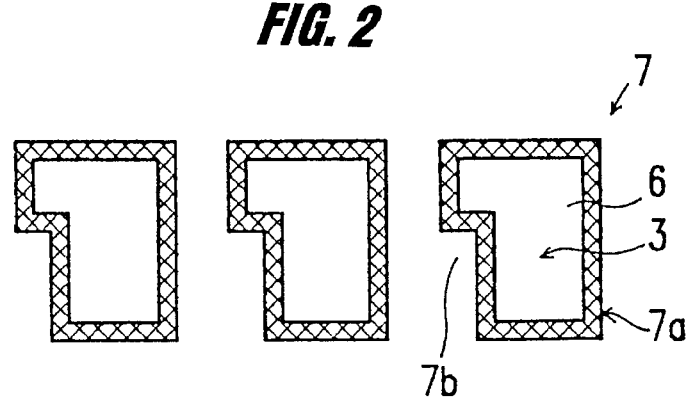
FIG. 2 is a plan view illustrating the positional relationship between color filters and a black mask in the LCD device in the first example.

FIG. 2 is a plan view in relevant portion of the LCD device 20 illustrating the black mask 7 and color filters 6. As is shown in FIG. 2, the black mask 7 includes a plurality of light shielding areas 7a and a light transmitting area 7b between two adjacent light shielding areas 7a. A light shielding area 7a surrounds each of the color filters 6. The bus lines 4 and the TFTs are located in relation with the light transmitting area 7b to shield light transmitted through the light transmitting area 7b. The size and the position of the light transmitting area 7b are suitably determined in accordance with the area of the bus lines 4 and the TFT. The light transmitted through the light transmitting area 7b may be shielded by elements other than the bus lines 4 and the TFTs.

Referring again to FIG. 1, a protective layer 8 is provided on the surface of the base plate 2a, covering the black mask 7 and the color filters 6. The protective layer 8 is covered with a counter electrode 9, and the counter electrode 9 is covered with an alignment film 10. The alignment film 10 can be omitted.

The LCD device 20 having the above-described structure is produced in the following manner.

On the base plate 2a having a thickness of 1.1 mm, the color filters 6 and the black mask 7 are formed. The protective layer 8 is formed on the surface to cover the color filters 6 and the black mask 7. The transparent counter electrode 9 formed of indium tin oxide (hereinafter, referred to as "ITO") is laminated in a thickness of 50 nm on the protective layer 8. Thus, the counter substrate 2 is prepared. On the surface of the base plate 1a, the pixel electrodes 3, the bus lines 4 and the TFTs are provided to prepare the TFT substrate 1 for a 4-inch display panel, for example.

The surface of the TFT substrate 1 having the above-mentioned elements thereon is coated with a polyimide material by spin-coating to form the alignment film 5. The surface of the counter substrate 2 having the above-mentioned elements thereon is also coated with a polyimide material by spin-coating to form the alignment film 10. The alignment films 5 and 10 are not treated with rubbing or the like. The alignment films 5 and 10 are not necessary.

Next, the TFT substrate 1 and the counter substrate 2 are positioned opposite to each other and are spaced apart by inserting spacers having a diameter of 5.5 µm therebetween, thereby forming a liquid crystal cell. Due to the spacers, the thickness of the cell is entirely uniform.

In the space between the TFT substrate 1 and the counter substrate 2, a mixture of 0.12 g of R-684 (produced by Nippon Kayaku Co., Ltd.), 0.05 g of p-phenylstyrene, 0.75 g of isobornyl methacrylate, 0.08 g of perfluorooctyl methacrylate, 4 g of ZLI-4792 (includes 0.3% of S-811 as a chiral dopant; produced by E. Merck & Co., Inc.) as a liquid crystal material, and 0.0025 g of Irugacure 651 (produced by Ciba-Geigy Corporation) as a photo-initiator is vacuum-injected at a temperature of 35° C. R-684, p-phenylstyrene, isobornyl methacrylate and perfluorooctyl methacrylate are photocurable resins. The above-mentioned materials except for the liquid crystal material are used to form the polymer wall 12. For the polymer wall 12, other photocurable materials may also be used as will be appreciated.

The resultant liquid crystal cell is maintained at a temperature of 40° C. for 40 minutes under a nitrogen atmosphere, and ultraviolet rays having a wavelength in the range of 250 to 400 nm is radiated upon the liquid crystal cell at the same temperature. For example, a high pressure mercury lamp for emitting collimated light is used as an optical source for radiation of ultraviolet rays. The light is radiated on the liquid crystal cell from the side of the counter substrate 2 in the direction of arrow L. The liquid crystal cell is placed below the mercury lamp at a position where a light intensity of 10 mW/cm$^2$ (measured for 365 nm) is obtained. The light is radiated for one second and stopped for 30 seconds, and such a cycle is repeated 20 times. Then, the ultraviolet rays are continuously radiated for 10 minutes, stopped for 10 min, and then again radiated for another 10 minutes. Such a process is taken in order to cause photopolymerization of the polymers at a lower rate than the case when light is continuously radiated from the start. In this manner, the polymers used to form the polymer wall 12 are cured.

The color filters 6 have an optical portion which has a transmittance of 50% or less with respect to light of at least one wavelength in the range of 250 to 400 nm and has a maximum transmittance of at least 20% with respect to light of a wavelength of more than 400 nm. By such color filters 6, ultraviolet rays having a wavelength in the range of 400 nm or less is almost completely shielded as well as by the light shielding areas 7a of the black mask 7. Thus, the light transmitted mainly through the light transmitting area 7b of the black mask 7 reaches the mixture.

Figure 17:
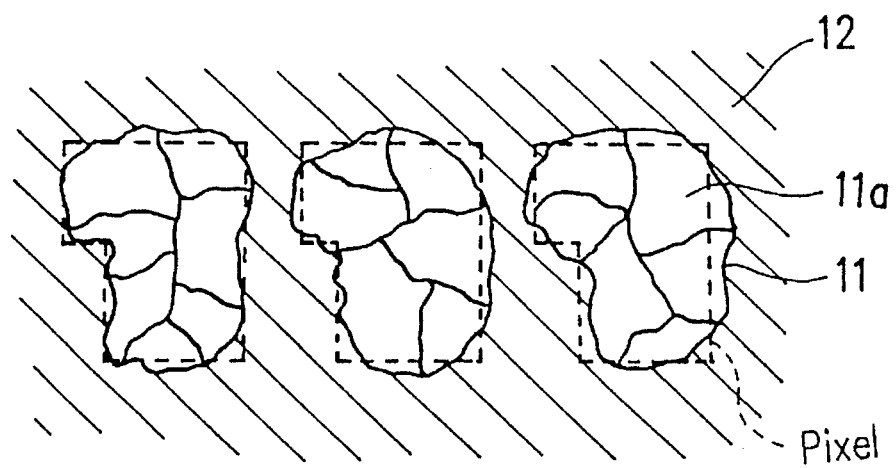
FIG. 17 is a schematic plan view illustrating liquid crystal regions and a polymer wall in an LCD device according to the present invention.

The photopolymerization of the polymers starts in the areas far from the areas corresponding to the pixels and proceeds to the areas closer to the areas corresponding to the pixels. As a result, the liquid crystal regions 11 are formed in the areas corresponding to the pixels, and the polymer wall 12 is formed in the other area to surround the liquid crystal regions 11. Thus, the liquid crystal layer 13 is obtained. FIG. 17 shows the liquid crystal regions 11 and the polymer wall 11 enclosing the liquid crystal regions 11 formed in this manner. As is mentioned above, since the rate of photopolymerization is reduced by repeating the cycle of performing and stopping radiation, liquid crystal domains 11a in each liquid crystal region 11 are randomly arranged. Although the photo-initiator is not absolutely necessary, the use thereof facilitates the photopolymerization.

The liquid crystal cell including the liquid crystal layer 13 is then sandwiched between two polarizing plates (not shown) having polarizing axes perpendicular to each other to produce the LCD device 20.

Figure 3:
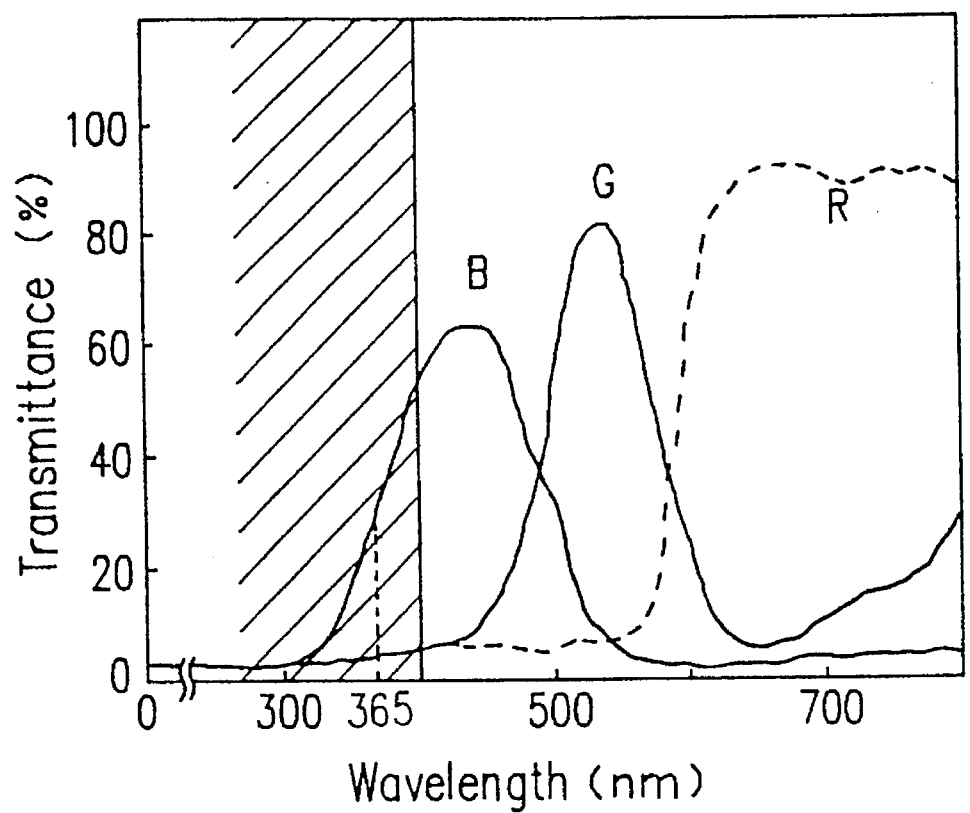
FIG. 3 is a graph illustrating the light transmittance vs. wavelength relationship of the color filters used in the LCD device in the first example.

The color filters 6 each have a red (R), green (G) or blue (B) area. FIG. 3 is a graph illustrating the light transmittance through the R, G, and B areas of the color filters 6. As is apparent from FIG. 3, the transmittance of the light having a wavelength of 365 nm is 50% or less through all the R, G, and B areas. The maximum transmittance of light in the wavelength range of 400 to 800 nm is 50% or more through any of the R, G and B areas. Due to such a characteristic of the color filters 6, when the ultraviolet rays are radiated in the production process of the LCD device 20, the color filters 6 shield light of a wavelength range which is required to cure the resins (hatched area in FIG. 3), and thus the ultraviolet rays are mainly transmitted through the light transmitting area 7b to cure the resins. As a result, the liquid crystal regions 11 are formed in the areas corresponding to the pixels and the polymer wall 12 is formed in the other areas.

Figure 4A:
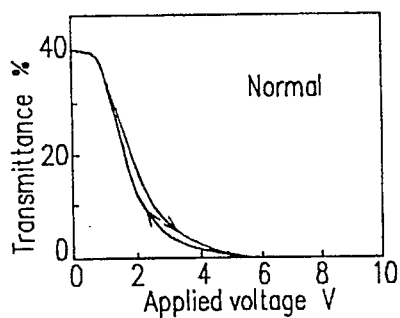
FIGS. 4(a) through 4(e) are graphs illustrating the viewing angle characteristics of the LCD device in the first example obtained at different viewing angles.
Figure 4B:
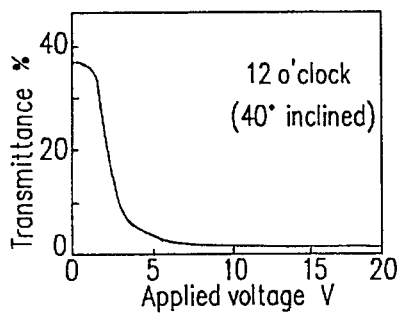
Figure 4C:
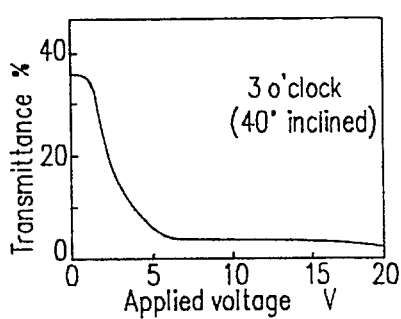
Figure 4D:
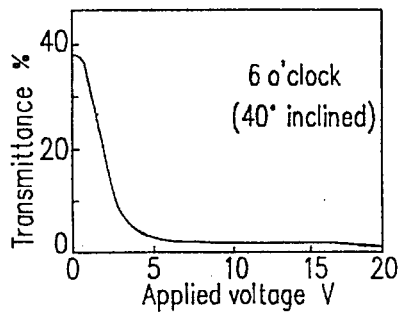
Figure 4E:
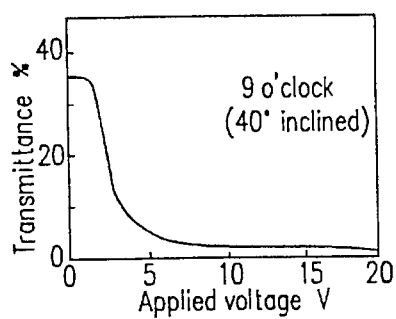
Figure 4F:
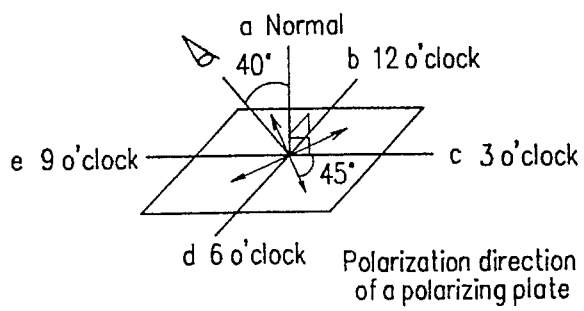
FIG. 4(f) is a geometric diagram illustrating the viewing angles.

FIGS. 4(a), 4(b), 4(c), 4(d) and 4(e) are graphs each illustrating the viewing angle characteristic of the LCD device 20, namely, the relationship between the voltage applied to the LCD device 20 and the transmittance of the light. FIGS. 4(a) through 4(e) show results obtained by the measurement at different viewing angles. FIG. 4(f) represents the respective directions in which the electro-optical characteristics are measured in FIGS. 4(a) through 4(e). FIG. 4(a) shows an electro-optical characteristic measured in a direction normal to the plane surface of the cell. FIG. 4(b) shows an electro-optical characteristic measured in a direction which is inclined at 40° toward a direction b from the direction a and the direction b has an angle of 45° with respect to a polarizing axis of the upper polarizer. FIG. 4(c) shows an electro-optical characteristic measured in a direction which is inclined at 40° toward a direction c from the direction a and the direction c has an angle of 45° with respect to a polarizing axis of the upper polarizer. FIG. 4(d) shows an electro-optical characteristic measured in a direction which is inclined at 40° toward a direction d from the direction a and the direction d has an angle of 45° with respect to a polarizing axis of the upper polarizer. FIG. 4(e) shows an electro-optical characteristic measured in a direction which is inclined at 40° toward a direction e from the direction a and the direction e has an angle of 45° with respect to a polarizing axis of the upper polarizer. The directions b, c, d, and e are shifted by 90° from each other.

For sake of comparison, 100% transmittance was taken as the intensity of light transmitted through only the area corresponding to the color filters of the LCD device when the polarizing axes of the polarizing plates are aligned in the same direction and there is no liquid crystal material present in the LCD device.

As is apparent from FIGS. 4(a) through 4(e), the LCD device 20 in the first example has an excellent viewing angle characteristic in that inversion or contrast change in accordance with different viewing angles hardly occurs.

It was confirmed by observation using a polarizing microscope that the liquid crystal regions 11 were formed in the areas corresponding to the pixels and that the liquid crystal domains were randomly arranged in each liquid crystal region 11.

Figure 5A:
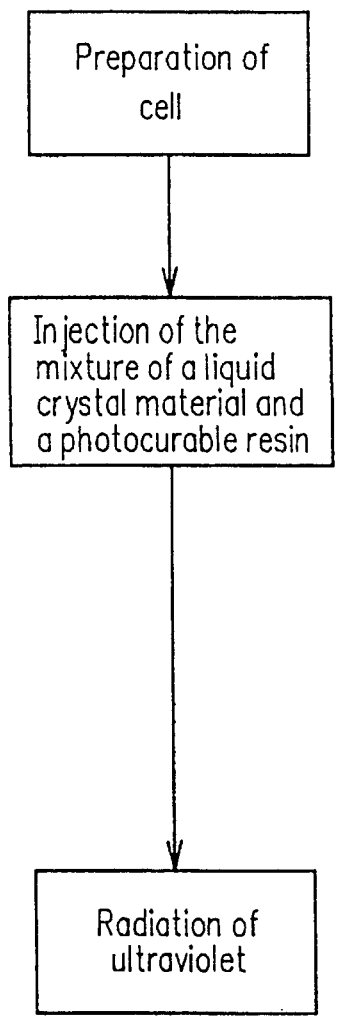
FIG. 5(a) is a flowchart showing a production process of the LCD device in the first example.
Figure 5B:
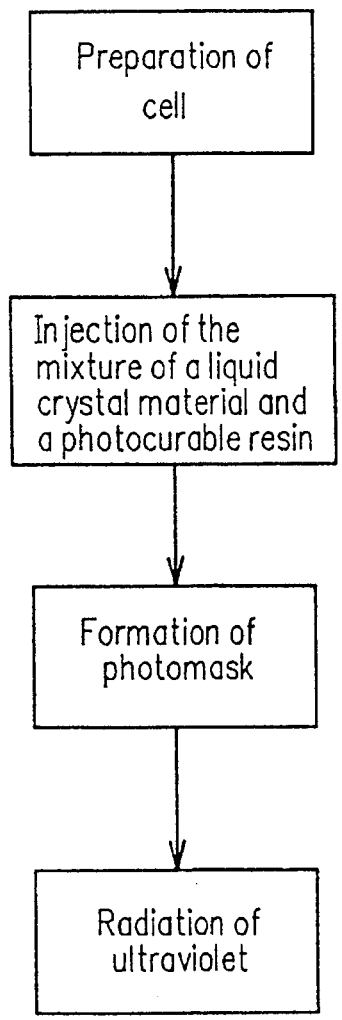
FIG. 5(b) is a flowchart showing a production process of a conventional LCD device.

FIG. 5(a) shows a process for producing the LCD device 20 in the first example, and FIG. 5(b) shows a process using a photomask for producing an LCD device. Conventionally, as is shown in FIG. 5(b), after a liquid crystal cell is prepared, a mixture of a liquid crystal material and a photocurable resin is injected into the liquid crystal cell. After that, the liquid crystal cell is covered with an external photomask, and then ultraviolet rays are radiated. By contrast, according to the first example of the present invention, an LCD device having an excellent viewing angle characteristic can be produced without using photomask. Thus, the production process is significantly simplified. Further, since the color filters also acting as a photomask for shielding the ultraviolet rays are radiated in a self-aligning manner with respect to the pixels, positioning of the color filters relative to the pixels is not necessary. Such effects concerning the color filters are also achieved in the third through fifth examples.

In this specification, "on" indicates both direct and indirect contact of two layers.

EXAMPLE 2

An LCD device in accordance with a second example according to the present invention is produced as follows.

Figure 6:
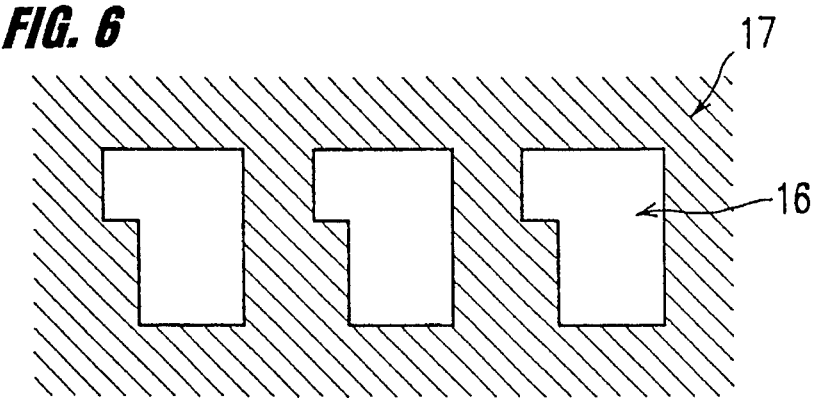
FIG. 6 is a plan view of color filters and a black mask used in a second example.

A TFT substrate identical with the one used in the first example and a counter substrate including a black mask 17 and color filters 16 illustrated in FIG. 6 are assembled as in the same manner in the first example to prepare a liquid crystal cell.

Next, photomasks 18 as are shown in a microscopic view in FIG. 7 are provided on the outer surface of the TFT substrate in correspondence with the color filters 16. Then, a mixture identical with the one used in the first example is injected into the liquid crystal cell, and ultraviolet rays are radiated toward the liquid crystal cell from the side of the TFT substrate.

The resultant liquid crystal cell was disassembled and the liquid crystal material was washed away by acetone. FIG. 8 is a view of liquid crystal regions 21 surrounded by a polymer wall 22 observed by a scanning electron microscope. As is illustrated in FIG. 8, the liquid crystal regions 21 are formed even in an area corresponding to bus lines A including source bus lines and gate bus lines, and the polymer wall 22 invades into the areas corresponding to the pixels B. Such a phenomenon occurs because the source bus lines and the gate bus lines also act as a photomask against the ultraviolet rays are radiated from the side of the TFT substrate.

The liquid crystal cell including the abovementioned mixture cured by the ultraviolet rays are sandwiched between two polarizing plates having polarizing axes perpendicular to each other, to produce the LCD device.

Table 1 shows the electro-optical characteristic, namely, the transmittance of light through the LCD devices produced in the first and the second examples and also in third through sixth examples (infra). The transmittance was measured when no voltage was applied to the LCD devices. For comparison, 100% transmittance was taken as the intensity of light transmitted through only the area corresponding to the color filters of the LCD device when the polarizing axes of the polarizing plates are aligned in the same direction and there is no liquid crystal material present in the LCD device.

TABLE 1

| | Ex 1 | Ex 2 | Ex 3 | Ex 4 | Ex 5 | Ex 6 |
|---|---|---|---|---|---|---|
| Transmittance (%) | 40 | 22 | 20 | 39 | 37 | 38 |

As is understood from Table 1, the LCD device in the second example has a transmittance of 22%, which is lower than 40% obtained in the first example.

EXAMPLE 3

In a third example according to the present invention, an LCD device is produced in the same manner as in the first example except that a sufficiently thinner color filter is used so that the lowest transmittance of light having a wavelength of 365 nm obtained by either one of the R, G and B area of the color filters 6 is 54%.

FIG. 9 is a plan view of an area of the liquid crystal layer corresponding to a pixel of the LCD device produced in the third example. Since the color filter is sufficiently thin to allow transmission of light having a wavelength of 365 nm, a polymer material F invades into an area D corresponding to the pixel as well as a liquid crystal material E.

From Table 1, the transmittance through the LCD device in the third example is significantly lower than that in the first example.

EXAMPLE 4

In a fourth example according to the present invention, an LCD device including an alignment film having spherulites (polycrystal) is produced in the following manner.

A TFT substrate identical with the one used in the first example is coated with nylon 6 dissolved in m-cresol by spin-coating, maintained at 170° C. for an hour, and then gradually cooled at a rate of 1° C./10 min. Thus, an alignment film having spherulites on a surface thereof is formed on the TFT substrate.

The resultant TFT substrate and a counter substrate identical with the one used in the first example are assembled in the same manner as in the first example to prepare a liquid crystal cell. A mixture identical with the one used in the first example is injected into the liquid crystal cell, and an ultraviolet rays are radiated toward the liquid crystal cell in the same manner as in the first example to cure the resins.

The resultant liquid crystal cell is sandwiched between two polarizing plates having polarizing axes perpendicular to each other to produce the LCD device. As is shown in Table 1, a satisfactory transmittance of light of 39% was obtained when no voltage was applied.

It was found by observation using a polarizing microscope that, due to spherulites in the alignment film, liquid crystal regions in contact with the alignment film had liquid crystal domains radially arranged along the spherulites. Accordingly, the excellent viewing angle characteristic is obtained without using a photomask.

EXAMPLE 5

In a fifth example according to the present invention, an LCD device including a liquid crystal region having radially arranged liquid crystal domains is produced in the following manner.

A TFT substrate identical with the one used in the first example is coated by spin-coating with a photoresist including 3 wt % of Gelol which is an organic crystal-nucleation agent.

Figure 10:
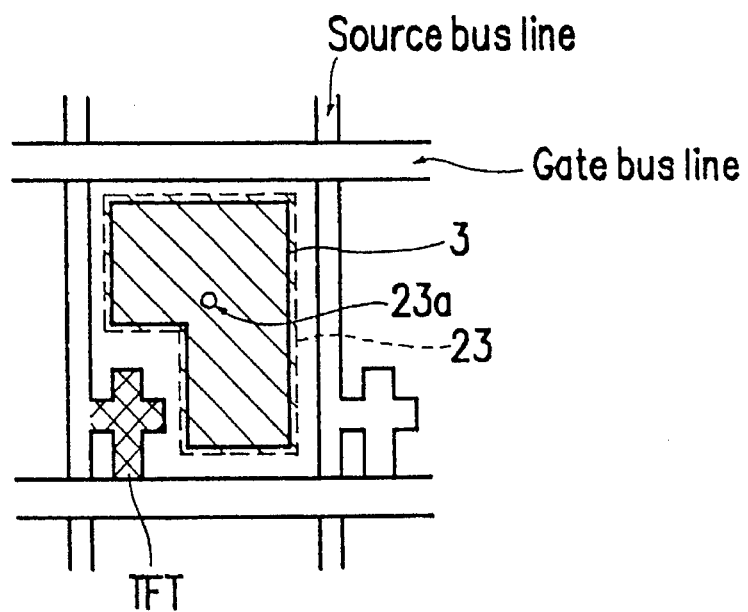
FIG. 10 is a plan view illustrating the positional relationship between a photomask and a pixel electrode in an LCD device in a fifth example according to the present invention.
Figure 11:
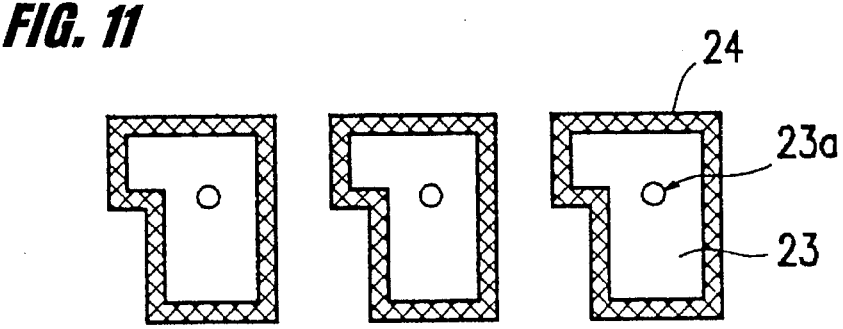
FIG. 11 is a plan view illustrating the positional relationship between color filters and a black mask in the LCD device in the fifth example.

As is shown in FIG. 10, a photomask 23 having a circular light transmitting hole 23a having a diameter of 15 μm is provided on the TFT substrate so that the light transmitting hole 23a is located at the center of each pixel electrode 3. Then, the TFT substrate is exposed to light and developed, thereby forming an alignment film. The alignment film is treated by rubbing the surface thereof using a nylon cloth, thereby depositing the organic nucleation agent on the surface of the alignment film. The alignment direction of the resultant alignment film is radial from the organic nucleation agent at the center of the area corresponding to the pixel, which is exposed to light through the light transmitting hole 23a. FIG. 11 is a view illustrating the positional relationship between the photomask 23 and a black mask 24 also provided on the TFT substrate.

The TFT substrate and a counter substrate identical with the one used in the first example are assembled to form a liquid crystal cell in the same manner as in the first example.

Figure 12:
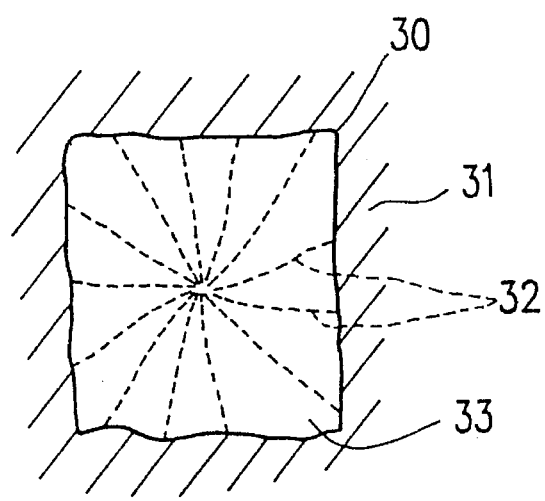
FIG. 12 is a schematic view illustrating a liquid crystal region in an LCD device in the fifth example obtained by a polarizing microscope.

FIG. 12 is a view of a liquid crystal region 30 and the vicinity thereof in the liquid crystal cell obtained by a polarizing microscope. The liquid crystal region 30 is formed at approximately the center of the area corresponding to the pixel and surrounded by a polymer wall 31 as is shown in FIG. 12. In accordance with the radial alignment of the alignment film, liquid crystal domains 33 are radially arranged in the state of being separated from one another by a disclination line 32.

Figure 13A:
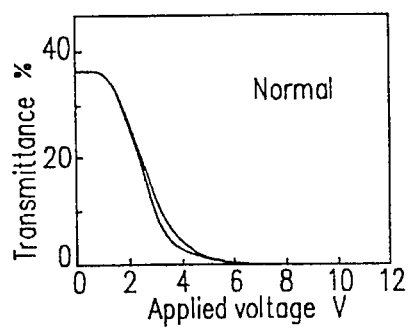
FIGS. 13(a) through 13(e) are graphs illustrating the viewing angle characteristics of the LCD device in the fifth example obtained at different viewing angles.
Figure 13B:
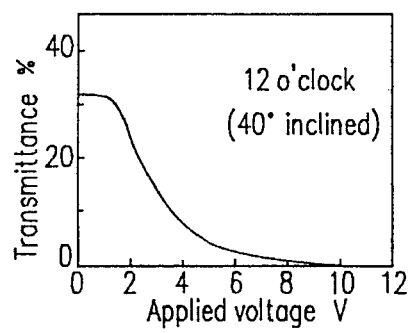
Figure 13C:
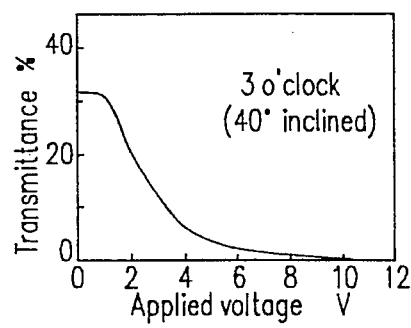
Figure 13D:
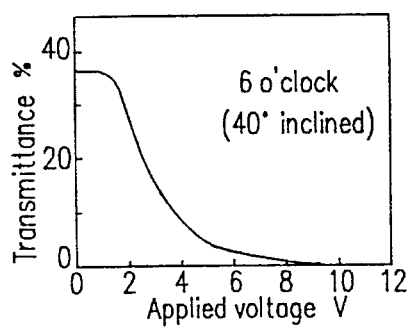
Figure 13E:
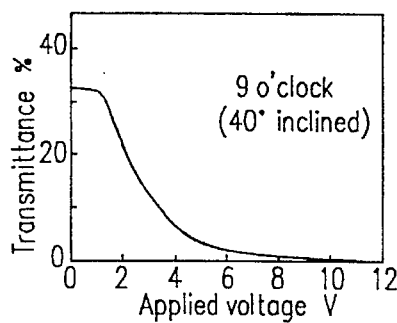
Figure 13F:
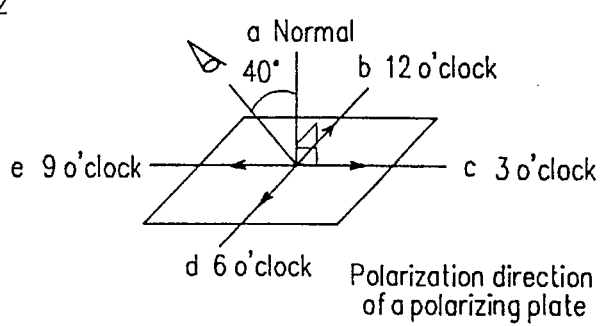
FIG. 13(f) is a geometric diagram illustrating the viewing angles.

The liquid crystal cell is sandwiched between two polarizing plates in the same manner as in the first example to produce an LCD device. FIGS. 13(a), 13(b), 13(c), 13(d) and 13(e) are graphs each illustrating the viewing angle characteristic of the LCD device, namely, the relationship between the voltage applied to the LCD device and the transmittance of the light. FIG. 13(f) is a geometric diagram showing each of the viewing angles. FIG. 13(a) shows an electro-optical characteristic measured in a direction normal to the plane surface of the cell. FIG. 13(b) shows an electro-optical characteristic measured in a direction which is inclined at 40° toward a direction b from the direction a and the direction b is parallel to a polarizing axis of one of the polarizers. FIG. 13(c) shows an electro-optical characteristic measured in a direction which is inclined at 40° toward a direction c from the direction a and the direction c is parallel to a polarizing axis of one of the polarizers. FIG. 13(d) shows an electro-optical characteristic measured in a direction which is inclined at 40° toward a direction d from the direction a and the direction d is parallel to a polarizing axis of one of the polarizers. FIG. 13(e) shows an electro-optical characteristic measured in a direction which is inclined at 40° toward a direction e from the direction a and the direction e is parallel to a polarizing axis of one of the polarizers. The directions b, c, d, and e are shifted by 90° from each other. 100% transmittance was taken in the same manner as in the first example.

As is apparent from FIGS. 13(a) through 13(e), in the state where the liquid crystal domains are radially arranged as in the fifth example, the viewing angle characteristic does not decline even when a saturation voltage is applied to the LCD device, and thus a high contrast is obtained in a wide range of viewing angles.

In the case where color filters are used, the light transmitting area 7b preferably occupies 5 to 100% of the area other than the areas corresponding to the pixels. If the transmitting area 7b is less than 5%, the exposure to light should be performed for a longer period of time, which causes problems such as reduction in productivity.

As described in the first example, in the case where the source bus lines (or signal lines) and the gate bus lines (or scanning lines) or a separate light shielding member is provided on the TFT substrate 1 in an area corresponding to the light transmitting area 7b, light is prohibited from leaking from areas other than the areas corresponding to the pixels, thereby improving the image contrast. Preferably, the black mask 7 is provided in such a manner as to protect the TFTs from light radiation. In such a case, the TFTs are protected from light having a strong intensity, and thus the characteristics of the TFTs are hardly deteriorated.

In order to improve the viewing angle characteristic of the LCD device, liquid crystal domains are preferably arranged radially as is described in the fourth example and in the fifth example with reference to FIG. 12. By performing the photopolymerization at a still lower rate than in the third example, a liquid crystal region 40 shown in FIG. 14 is formed without performing special treatment on the alignment film. The liquid crystal region 40 includes an inner liquid crystal area 41 and an outer liquid crystal area 42 which are separated from each other by a polymer area 43. The outer liquid crystal area 42 is surrounded by a polymer wall 44. In the outer liquid crystal area 42, liquid crystal domains 46 isolated from one another by a disclination line 45 are radially arranged.

In addition to performing special treatment on the alignment film and reducing the photopolymerization rate, the liquid crystal domains can be radially arranged by the following method: A light transmitting hole is formed at an approximate center of a color filter. The photopolymerization is performed by light which has been transmitted both through the transmitting hole and the transmitting area of the black mask. In such a case, as is illustrated in FIG. 15, a polymer area 34 is located at a center of a liquid crystal region 30. In the liquid crystal region 30, liquid crystal domains 33 isolated from one another by a disclination line 32 are radially arranged.

Since the color filters are directly exposed to the ultraviolet rays, the color of the color filters may be undesirably changed. Such a phenomenon can be avoided by providing a layer for shielding the ultraviolet rays between the color filters and the counter substrate or by adding an ultraviolet absorber to the color filters.

EXAMPLE 6

Figure 18:
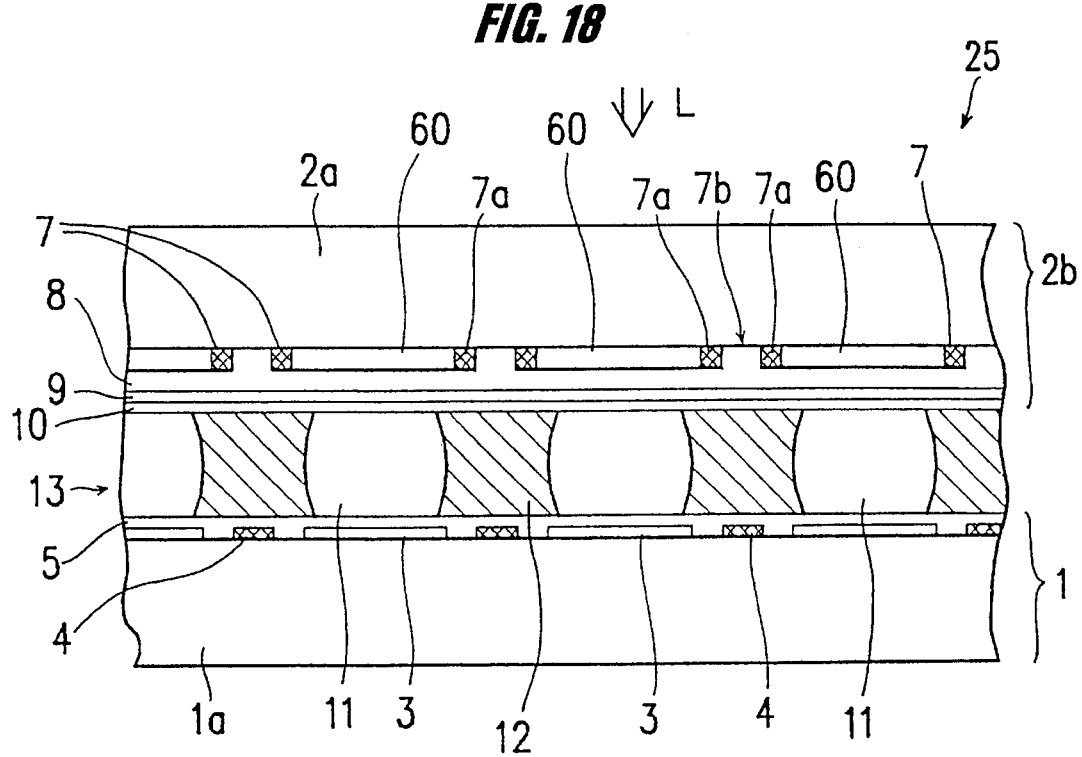
FIG. 18 is a cross sectional view of an LCD device in a sixth example according to the present invention.
Figure 19:
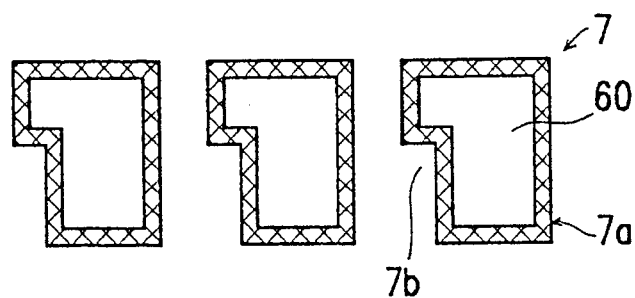
FIG. 19 is a plan view showing the positional relationhip between ultraviolet shielding layers and a black mask in the LCD device in the sixth example.

Referring to FIGS. 18 through 20, a sixth example according to the present invention will be described. In the sixth example, ultraviolet shielding layers 60 are used instead of the color filters 6 used in the first, fourth and fifth examples. According to the present invention, other optical elements may be used instead of the color filters 6 or the ultraviolet shielding layers 60. Identical elements with those in the first example bear identical reference numerals therewith.

FIG. 18 is a cross sectional view of an LCD device 25 in the sixth example. As is illustrated in FIG. 18, the LCD device 25 includes a TFT substrate 1 and a counter substrate 2b positioned opposite to the TFT substrate 1. A liquid crystal layer 13 is located between the TFT substrate 1 and the counter substrate 2b. In the liquid crystal layer 13, a plurality of liquid crystal regions 11 are surrounded by a polymer wall 12. The TFT substrate 1 includes a glass base plate 1a. A plurality of pixel electrodes 3 are provided in a matrix on a surface of the base plate 1a on the side of the liquid crystal layer 13. A plurality of bus lines 4 are provided in a lattice arrangement between two adjacent pixel electrodes 3 on the surface of the base plate 1a. The bus lines 4 serve to shield visible light and ultraviolet rays. The bus lines 4 include source bus lines running parallel to each other and gate bus lines running parallel to each other and perpendicular to the source bus lines. The pixel electrodes 3 are connected to a corresponding source bus line and gate bus line via a TFT (not shown) provided for each of the pixel electrodes 3. An external signal is sent to the pixel through the TFT via the source bus line based on a gate control signal delivered to the gate bus line connected to the pixel electrode 3. An alignment film 5 is provided on the surface of the base plate 1a, covering the pixel electrodes 3, the bus lines 4, and the TFTs.

The counter substrate 2b includes a glass base plate 2a. On a surface of the base plate 2a on the side of the liquid crystal layer 13, a black mask 7 is provided in an area not corresponding to the pixel electrodes 3 (e.g., the area opposite the space between the pixel electrodes 3). The ultraviolet shielding layers 60 are provided in an area which is not provided with the black mask 7. Although the black mask 7 is not necessary, semiconductor layers in the TFTs are preferably covered in order to prevent deterioration by light radiation. The black mask 7 may be provided in the area not corresponding to the pixel electrodes 3 and an area corresponding to a part of each pixel electrode 3. A "pixel" is defined by an area of each pixel electrode 3 which corresponds to the ultraviolet shielding layer 60.

FIG. 19 is a plan view in relevant portion of the LCD device 25 illustrating the black mask 7 and the ultraviolet shielding layers 60. As is shown in FIG. 19, the black mask 7 includes a plurality of light shielding areas 7a and a light transmitting area 7b between two adjacent light shielding areas 7a. A light shielding area 7a surrounds each ultraviolet shielding layer 60. The bus lines and the TFTs are located in relation with the light transmitted area 7b to shield light transmitted through the light transmitting area 7b.

Referring again to FIG. 18, a protective layer 8 is provided on the surface of the base plate 2a, covering the black mask 7 and the ultraviolet shielding layers 60. The protective layer 8 is covered with a counter electrode 9, and the counter electrode 9 is covered with an alignment film 10.

The LCD device 25 having the above-described structure is produced in the following manner.

A surface of the base plate 2a having a thickness of 1.1 mm is coated with a photoresist thin film including 3% of 1-methyanthracene as an ultraviolet ray absorber (OMR500; produced by Tokyo Ohka Co., Ltd.) using spin-coating or the like. The photoresist thin film is patterned to be the ultraviolet shielding layers 60 illustrated in FIG. 19. The black mask 7 is also formed on the surface of the base plate 2a. The protective layer 8 is formed on the surface to cover the ultraviolet shielding layers 60 and the black mask 7. The transparent counter electrode 9 is formed of ITO in a thickness of 50 nm on the protective layer 8. Thus, the counter substrate 2b is prepared.

On the surface of the base plate 1a, the pixel electrodes 3 formed of ITO the bus lines 4 and the TFTs are provided to prepare the TFT substrate 1.

The surface of the TFT substrate 1 having the above-mentioned elements thereon is coated with a polyimide material by spin-coating to form the alignment film 5. The surface of the counter substrate 2b having the above-mentioned elements thereon is also coated with a polyimide material by spin-coating to form the alignment film 10. The alignment films 5 and 10 are not treated with rubbing or the like. The alignment films 5 and 10 are not necessary.

Then, on at least one of the TFT substrate 1 and the counter substrate 2b, spacers (not shown) having a diameter of, for example, 5.5 μm is scattered. Peripheries of the TFT substrate 1 and the counter substrate 2b are coated with a sealing material, and the two substrates are held together to form a liquid crystal cell. Due to the spacers, the thickness of the liquid crystal cell is entirely uniform.

In the space between the TFT substrate 1 and the counter substrate 2b, a mixture of 0.12 g of R-684 (produced by Nippon Kayaku Co., Ltd.), 0.05 g of p-phenylstyrene, 0.75 g of isobornyl methacrylate, 0.08 g of perfluorooctyl methacrylate, 4 g of ZLI-4792 (including 0.3% of S-811 as a chiral dopant; produced by E. Merck & Co., Inc.) as a liquid crystal material, and 0.0025 g of Irugacure 651 (produced by Ciba-Geigy Corporation) as a photo-initiator is vacuum-injected at a temperature of 35° C.

The resultant liquid crystal cell is kept at a temperature of 40° C. for 40 minutes under a nitrogen atmosphere, and ultraviolet rays are radiated upon the liquid crystal cell at the same temperature. For example, a high pressure mercury lamp for emitting collimated light is used as an optical source for radiation of the ultraviolet rays. The light is radiated on the liquid crystal cell from the side of the counter substrate 2b in the direction of arrow L. The liquid crystal cell is placed below the mercury lamp at a position where a light intensity of 10 mW/cm$^2$ (measured for 365 nm) is obtained. The light is radiated for one second and stopped for 30 seconds, and such a cycle is repeated 20 times. Then, the ultraviolet rays are continuously radiated for 10 minutes. Thereafter, the radiation of the ultraviolet rays are performed for another 10 minutes from the side of the TFT substrate 1. In this manner, the polymers used to form the polymer wall 12 are cured.

The resultant liquid crystal cell is sandwiched between two polarizing plates having polarizing axes perpendicular to each other. In this manner, the LCD device 25 including the liquid crystal layer 13 having the liquid crystal regions 11 surrounded by the polymer wall 12 is produced. In each liquid crystal region 11, one or more liquid crystal domains are radially arranged.

FIGS. 20(a), 20(b), 20(c), 20(d) and 20(e) are graphs each illustrating the viewing angle characteristic of the LCD device 25, namely, the relationship between the voltage applied to the LCD device and the transmittance of the light. FIG. 20(f) is a geometric diagram showing each of the viewing angles. FIGS. 20(a) through 20(e) show results obtained by the measurement at the viewing angles described in Example 5 with reference to FIGS. 13(a) through 13(e). 100% transmittance was taken as the intensity of light transmitted through only the area corresponding to the ultraviolet shielding layers 60 of the LCD device when the polarizing axes of the polarizing plates are aligned in the same direction and there is no liquid crystal material present in the LCD device.

Table 2 shows the average of the transmittance values obtained at the four viewing angles.

TABLE 2

|  | Example 6 |
| --- | --- |
| Transmittance (%) | 38 |

As is apparent from FIGS. 20(a) through 20(e), the LCD device 25 in the sixth example has an excellent viewing angle characteristic in that inversion or contrast change depending on different viewing angles hardly occurs.

It was confirmed by observation using a polarizing microscope that the liquid crystal regions 11 were formed in the areas corresponding to the pixels and that the liquid crystal domains 33 were randomly arranged in each liquid crystal region 11 as is described above referring to FIG. 17 in the first example.

According to the sixth example, a photomask is not necessary, which significantly simplifies the production process. Further, the positioning precision for ultraviolet radiation can be improved.

In the first through sixth examples, two outer surfaces of the liquid crystal cell are both provided with a polarizing plate. However, in a different example, the liquid crystal cell may be provided with only one polarizing plate. For example, in an LCD device including a ferroelectric liquid crystal material to which a dichroic dye is added, only one polarizing plate is used. In such a case, in the initial state, the polarizing axis of the polarizing plate is perpendicular to the orientation direction of the liquid crystal molecules, and thus the liquid crystal layer is in a black state. By applying an inverting voltage, the liquid crystal molecules are put into a transparent state.

For performing monochrome display as in the sixth example, a thin film which partially shields ultraviolet rays and allows the entire range of visible light to transmit therethrough can be used as a photomask. Such a thin film may be formed of a transparent polymer, for example, a photosensitive resin such as a photoresist material, styrene, PMMA, nylon, polyester, or polyvinyl alcohol. To these materials, an ultraviolet ray absorber such as an anthracene derivative, a naphthalene derivative, a diphenyl derivative, or a triphenyl derivative may be added. A thin film of a photosensitive resin is formed by applying a photolithography technique. Such a thin film shields the ultraviolet rays more tightly and allows the visible light to be transmitted therethrough at a high transmittance.

The color filter used in the first through fifth examples has an optical portion for each pixel which has a transmittance of no greater than 50% with respect to light of at least one wavelength in the range of 250 to 400 nm. The optical portion of the color filter has also a maximum transmittance of at least 20% with respect to light of a wavelength of more than 400 nm. More specifically, the optical portion of the color filter has a transmittance of at least 20% with respect to visible light of at least one wavelength in the range of 400 to 800 nm. Such a filter is used for the following reasons:

(1) Since such a color filter has a maximum light transmittance within a wavelength range for red, green and blue light, sufficient color display is obtained.

(2) Since such a color filter tends to block ultraviolet rays having a wavelength in the region of 400 nm or less, formation of liquid crystal regions in areas corresponding to the pixels and a polymer wall in other area is easily performed.

(3) If the color filter has a transmittance of 50% or more with respect to light in the entire wavelength range of 250 to 400 nm, the intensity of light transmitted through the light transmitting area and the intensity of light transmitted through the color filter have little difference from each other. Accordingly, a polymer wall is formed even in the areas corresponding to the pixels, resulting in a low image contrast. Preferably, the filter has a transmittance of no greater than 10% with respect to light of at least one wavelength in the range of 250 to 400 nm. In this case, the liquid crystal regions formed in the areas corresponding to the pixels and the polymer wall formed in the other area can be separated from each other more clearly.

(4) If the transmittance of visible light in the entire wavelength range of 400 to 800 nm through the color filter is less than 20%, the display is undesirably dark. The transmittance of visible light is preferably 50% or more.

In addition, in order to separate the liquid crystal region and the polymer wall as clearly as possible, the color filter preferably has an optical portion having a transmittance of no greater than 50% with respect to light of at least one wavelength in the range of 365 nm or less. 365 nm is the emission line of the mercury lamp. In this case also, the optical portion of the color filter preferably has a maximum transmittance of at least of 20% with respect to the light of a wavelength of 400 nm or more.

EXAMPLE 7

Figure 21:
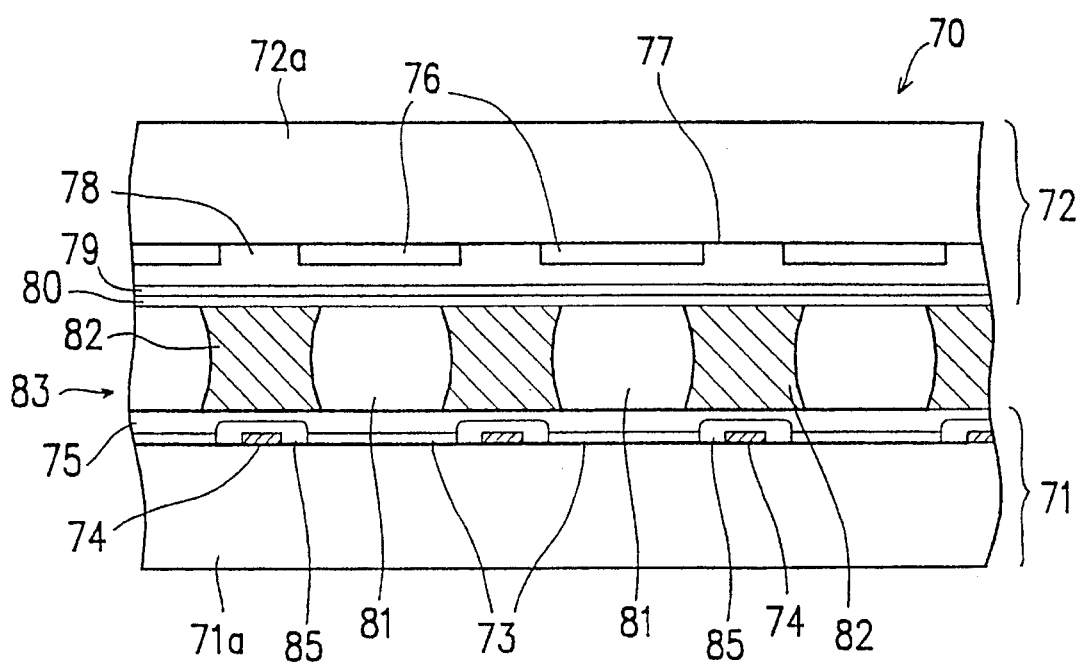
FIG. 21 is a cross sectional view of an LCD device in a seventh example according to the present invention.

Referring to FIG. 21, a seventh example according to the present invention will be described.

FIG. 21 is a cross sectional view of an LCD device 70 in accordance with the seventh example. As is illustrated in FIG. 21, the LCD device 70 includes a TFT substrate 71 and a counter substrate 72 positioned opposite the TFT substrate 71. A liquid crystal layer 83 is located between the TFT substrate 71 and the counter substrate 72. In the liquid crystal layer 83, a plurality of liquid crystal regions 81 are surrounded by a polymer wall 82. The TFT substrate 71 includes a glass base plate 71a. A plurality of pixel electrodes 73 are provided in a matrix on a surface of the base plate 71a on the side of the liquid crystal layer 83. A plurality of bus lines 74 are provided in a lattice arrangement between two adjacent pixel electrodes 73 on the surface of the base plate 71a. The bus lines 74 serve to shield visible light and ultraviolet rays. The bus lines 74 include source bus lines running parallel to each other and gate bus lines running parallel to each other and perpendicular to the source bus lines. The pixel electrodes 73 are connected to a corresponding source bus line and gate bus line via a TFT (not shown) provided for each of the pixel electrodes 73. An external signal is sent to the pixel through the TFT via the source bus line based on a gate control signal delivered to the gate bus line connected to the pixel electrode 73. A light shielding layer 85 is provided on the surface of the base plate 71a between the bus lines 74 and the TFTs connected to the bus lines 74, and the pixel electrodes 73. The light shielding layer 85 is formed of a non-conductive material such as a polymer mixed with a dye. An alignment film 75 is provided on the surface of the base plate 71a, covering the pixel electrode 73, the bus lines 74, TFTs, and the light shielding layer 85.

The counter substrate 72 includes a glass base plate 72a. On a surface of the base plate 72a on the side of the liquid crystal layer 83, a plurality of color filters 76 are provided in correspondence with the pixel electrodes 73. An area on the surface of the base plate 72a which is not covered with the color filters 76 is a light transmitting area 77. The light shielding layer 85 is located in correspondence with the light transmitting area 77 to prevent light leakage from the area other than the areas corresponding to the pixel electrodes 73. A "pixel" is defined by an area of each pixel electrode 73 corresponding to the color filter 76.

A protective layer 78 is provided on the surface of the base plate 72a, covering the color filters 76 and the light transmitting area 77. The protective layer 78 is covered with a counter electrode 79, and the counter electrode 79 is covered with an alignment film 80.

The light shielding layer 85 may be formed of metal such as molybdenum, tantalum, aluminum or the like instead of a polymer material, in which case, an insulation layer is provided between the light shielding layer 85, and the bus lines 74 and the TFTs.

The LCD device 70 in the seventh example has the same effects as those in the first, fourth, fifth and sixth examples.

EXAMPLE 8

An eighth example according to the present invention will be described with reference to FIGS. 22 and 23.

Figure 22:
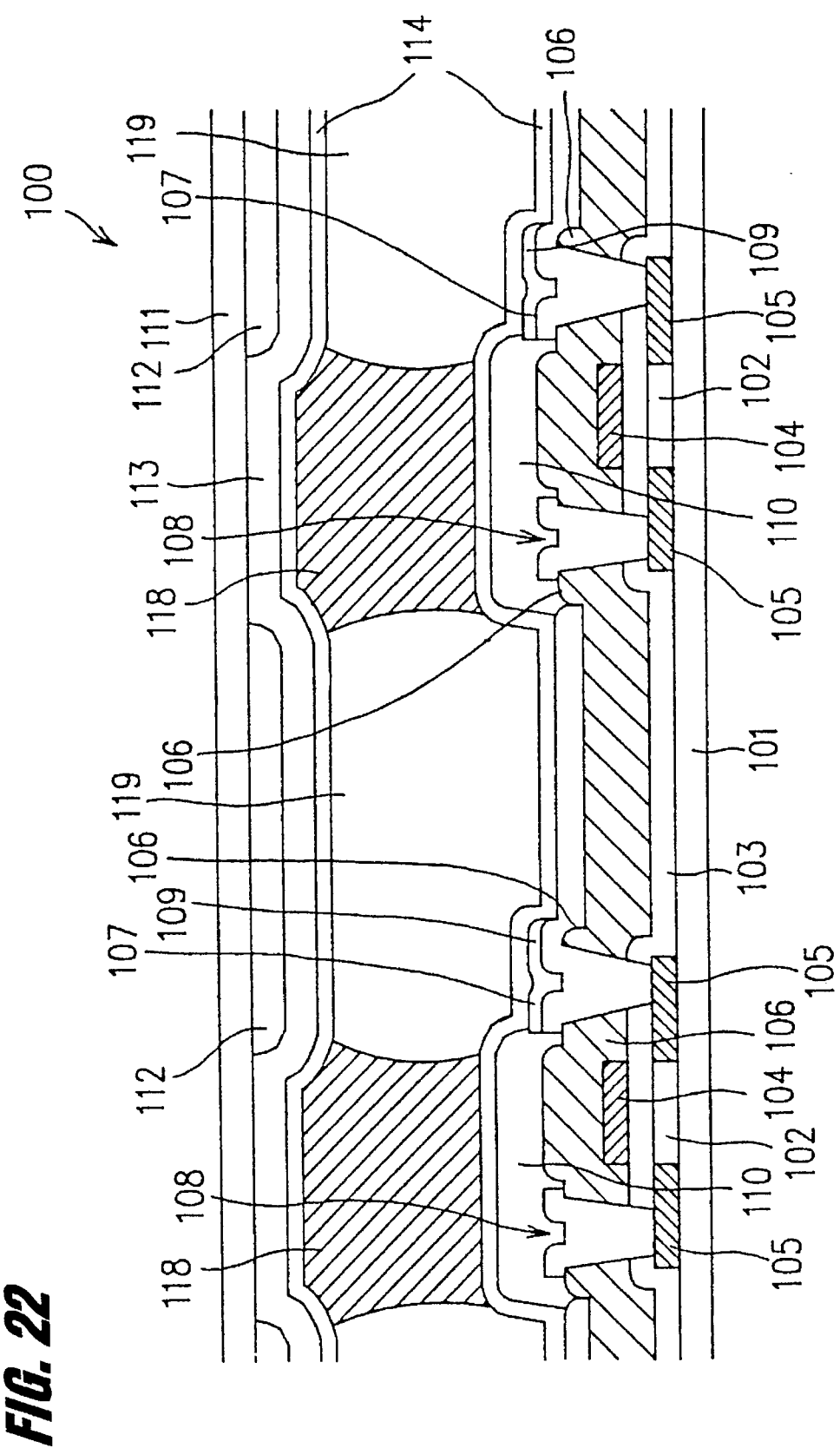
FIG. 22 is a cross sectional view of an LCD device in an eighth example according to the present invention.

FIG. 22 is a cross sectional view of an LCD device 100 including TFTs in accordance with the eighth example. FIG. 23 is a schematic illustration illustrating production processes of the LCD device 100.

Referring to FIGS. 22 and 23, the LCD device 100 is produced in the following manner.

On an electrically insulating TFT substrate 101, a semiconductor layer formed of, for example, p-Si is formed by low pressure chemical vapor deposition (hereinafter, referred to as the "LPCVD") in a thickness of 25 to 200 nm, preferably in a thickness of approx. 70 to 100 nm and patterned to form a semiconductor layer 102. On the semiconductor layer 102, a $SiO_2$ layer is formed by plasma chemical vapor deposition (hereinafter, referred to as "PCVD") or the like in a thickness of 200 to 500 nm, preferably in a thickness of approx. 200 nm and patterned to form a gate insulation layer 103. Two end areas of the gate insulation layer 103 are coated with a resist, and a central area of the gate insulation layer 103 is etched to be left in a thickness of preferably approx. 100 nm. Then, the resist is peeled off. Thus, a recessed portion is formed at the central area of the gate insulation layer 103.

A metal layer is formed on the gate insulating layer 103 in a thickness of 200 to 400 nm to form a gate electrode 104. Ions of a group V element such as phosphorus, a compound including a group V element, a group III element such as boron, or a compound including a group III element are implanted to a channel region as impurities at an accelerating voltage of 50 to 100 keV to form a contact layer 105. Then, a $SiN_x$ layer or a $SiO_2$ layer is formed by PCVD or the like in a thickness of 300 to 500 nm. The layer is etched at a specified position to form a contact hole, thereby forming an interlayer insulation layer 106. An ITO layer is formed on the interlayer insulation layer 106 by sputtering or the like in a thickness of 50 to 100 nm to form pixel electrodes 107. A conductive layer is formed on the pixel electrodes 107 by sputtering or the like in a thickness of 200 to 700 nm to form to a source electrode 108 and a drain electrode 109, thereby forming a TFT.

On the TFT, a layer of a primer, for example, amino silane coupling agent is formed by spin-coating, and cured at a temperature of 100° C. for five minutes. A black resin layer is formed of, for example, a photosensitive resin including a black pigment dispersed therein on the primer layer in a thickness of 1 to 2 μm, preferably in a thickness of 1 μm by spin-coating, and prebaked at a temperature of 90° C. for 15 minutes. On the black resin layer, an oxygen shielding layer is formed by spin-coating and cured at a temperature of 90° C. for five minutes. The oxygen shielding layer is covered with a mask having holes at positions corresponding to the pixel electrodes 107, and the resultant laminate is exposed to light. The resultant laminate is rinsed to wash away the oxygen shielding layer, developed, and then rinsed again. The resultant laminate is subjected to post-baking at a temperature of 200° C. for 30 minutes. Thus, a black matrix 110 is prepared.

On another electrically insulating counter substrate 111, a layer of a color filter material including a pigment dispersed therein is formed by printing, electrodeposition, or spin-coating and patterned into a specified pattern to form color filters 112. On the counter substrate 111, a transparent conductive layer is formed of ITO in a thickness of 50 to 100 nm by sputtering or the like, covering the color filters 112, to form a counter electrode 113.

As is shown in part (a) of FIG. 23, the TFT substrate 101 and the counter substrate 111 having the above-mentioned elements thereon are both covered with an alignment film 114. On the alignment film 114 on the counter substrate 111, plastic beads having a diameter of 3.5 μm are scattered as spacers. Then, the TFT substrate 101 and the counter substrate 111 are held together with a sealing resin to prepare a liquid crystal cell.

As is shown in part (b) of FIG. 23, the outer surface of the counter substrate 111 is coated with a negative photosensitive resin layer 115. The resultant liquid crystal cell is exposed to light from the side of the TFT substrate 101 using the black matrix 110 as a mask to pattern the negative photosensitive resin layer 115.

Then, a mixture 117 of 0.1 g of R-684 (produced by Nippon Kayaku Co., Ltd.), 0.05 g of styrene, 0.85 g of isobornyl methacrylate, 4 g of a liquid crystal material ZLI-4792 (including 0.4 wt % of S-811; produced by E. Merck & Co., Inc.), and 0.0025 g of Irugacure 651 as a photo-initiator is injected into the resultant liquid crystal cell in a transparent state (at a temperature of 35° C.).

As is shown in part (c) of FIG. 23, an ultraviolet rays are radiated to the liquid crystal cell at the same temperature. In detail, a high pressure mercury lamp for emitting collimated light is used as an optical source for radiation of the ultraviolet rays. The light is radiated on the liquid crystal cell from the side of the photosensitive resin layer 115. The liquid crystal cell is placed below the mercury lamp at a position where a light intensity of 10 mW/cm$^2$ is obtained. The light is radiated for one second and stopped for 30 seconds, and such a cycle is repeated 20 times. Then, the ultraviolet rays are continuously radiated for 10 minutes to cure the resin. As a result, the mixture 117 is divided into a polymer phase 118 and a liquid crystal phase 119 as is shown in part (d) of FIG. 23. The photosensitive resin layer 115 is removed by a remover to form the LCD device 100 as is shown in part (e) of FIG. 24. By examination using a polarizing microscope, liquid crystal domains in the liquid crystal phase 119 formed in areas corresponding to the pixel electrodes 107 were confirmed.

In the eighth example, the polymer phase 118 is separated from the liquid crystal phase 119 by self-alignment of the liquid crystal cell. Accordingly, the liquid crystal layer having the liquid crystal phase 119 in areas corresponding to the pixel electrodes 107 are easily formed by self-alignment.

EXAMPLE 9

A ninth example according to the present invention will be described with reference to FIGS. 24 and 25.

Figure 24:
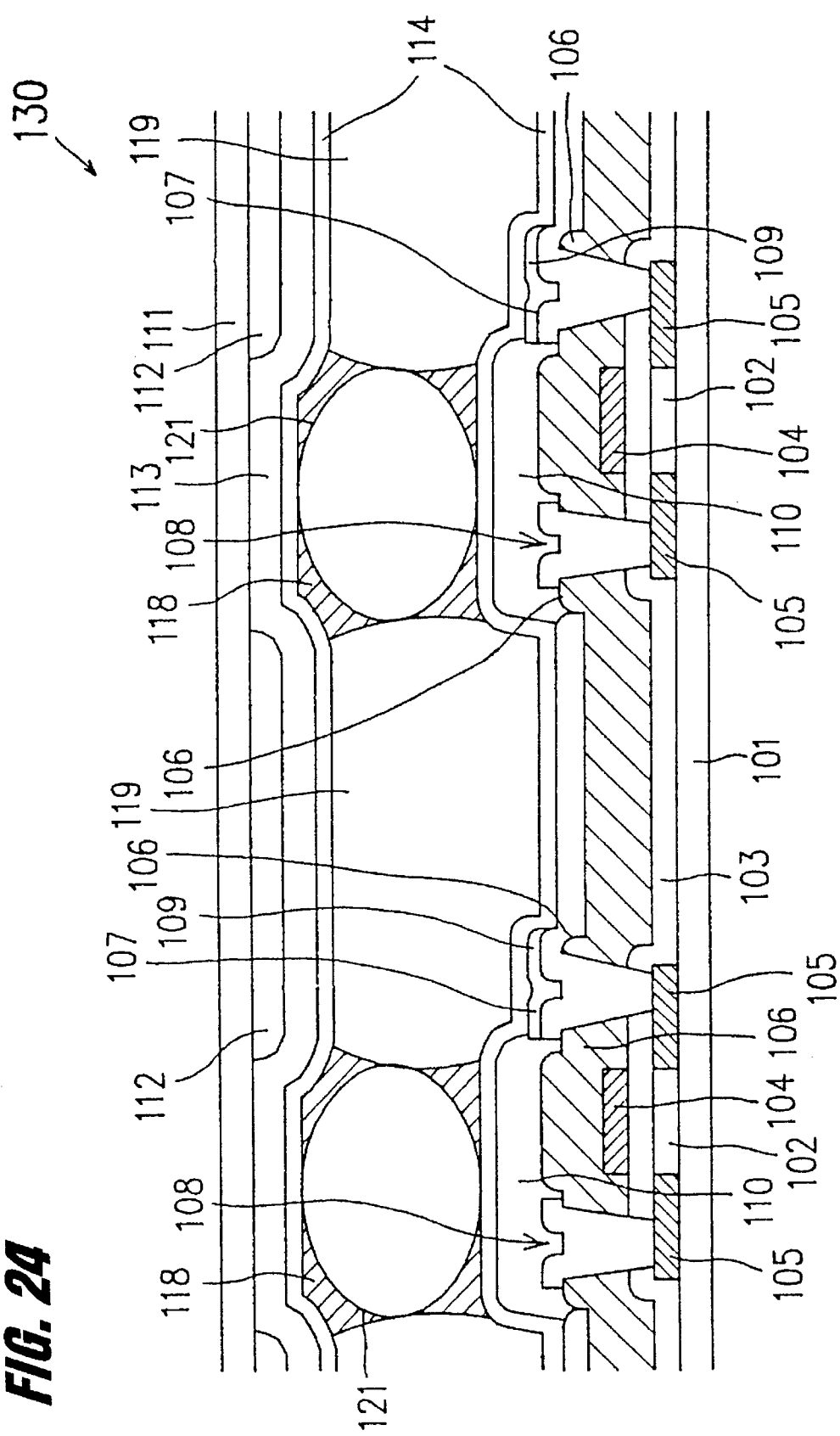
FIG. 24 is a cross sectional view of an LCD device in a nigh example according to the present invention.

FIG. 24 is a cross sectional view of an LCD device 130 in the ninth example. FIG. 25 is a schematic illustration illustrating production processes of the LCD device 130. Elements identical with those in the eighth example bear identical reference numerals therewith.

Referring to FIGS. 24 and 25, the LCD device 130 is produced in the following manner.

On an electrically insulating TFT substrate 101, a semiconductor layer formed of, for example, p-Si is formed by LPCVD in a thickness of 25 to 200 nm, preferably in a thickness of approx. 70 to 100 nm and patterned to form a semiconductor layer 102. On the semiconductor layer 102, a $SiO_2$ layer is formed by PCVD or the like in a thickness of 200 to 500 nm, preferably in a thickness of approx. 200 nm and patterned to form a gate insulation layer 103. Two end areas of the gate insulation layer 103 are coated with a resist, and a central area of the gate insulation layer 103 is etched to be left in a thickness of preferably approx. 100 nm. Then, the resist is peeled off. Thus, a recessed portion is formed at the central area of the gate insulation layer 103.

A metal layer is formed on the gate insulating layer 103 in a thickness of 200 to 400 nm to form a gate electrode 104. Ions of a group V element such as phosphorus, a compound including a group V element, a group III element such as boron, or a compound including a group III element are implanted to a channel region as impurities at an accelerating voltage of 50 to 100 keV to form a contact layer 105. Then, a $SiN_x$ layer or a $SiO_2$ layer is formed by PCVD or the like in a thickness of 300 to 500 nm. The layer is etched at a specified position to form a contact hole, thereby forming an interlayer insulation layer 106. An ITO layer is formed on the interlayer insulation layer 106 by sputtering or the like in a thickness of 50 to 100 nm to form pixel electrodes 107. A conductive layer is formed on the pixel electrodes 107 by sputtering or the like in a thickness of 200 to 700 nm to form a source electrode 108 and a drain electrode 109, thereby forming a TFT.

On the TFT, a layer of a primer, for example, an amino silane coupling agent is formed by spin-coating, and cured at a temperature of 100° C. for five minutes. A black resin layer is formed of, for example, a photosensitive resin including a black pigment and plastic beads 121 dispersed therein on the above layer by spin-coating, and prebaked at a temperature of 90° C. for 15 minutes. On the black resin layer, an oxygen shielding layer is formed by spin-coating and cured at a temperature of 90° C. for five minutes. The oxygen shielding layer is covered with a mask having holes at positions corresponding to the pixel electrodes 107, and the resultant laminate is exposed to light. The resultant laminate is rinsed to wash away the oxygen shielding layer, developed, and then rinsed again. The resultant laminate is subjected to post-baking at a temperature of 200° C. for 30 minutes. Thus, a black matrix 110 is prepared. The thickness of a liquid crystal cell which is to be prepared can be changed by adjusting the diameter of the plastic beads, 121. Since the plastic beads 121 are only located on the black matrix 110 corresponding to the pixel electrode 107, the display characteristics of the LCD device 130 can be improved.

On another electrically insulating counter substrate 111, a layer of a color filter material including a pigment scattered therein is formed by printing, electrodeposition, or spin-coating and patterned to a specified pattern to form color filters 112. On the counter substrate 111, a transparent conductive layer is formed of ITO in a thickness of 50 to 100 nm by sputtering or the like, covering the color filters 112, to form a counter electrode 113.

As is shown in part (a) of FIG. 25, alignment films 114 are formed above the pixel electrodes 107 (FIG. 24) on the TFT substrate 101 and above the color filters 112 (FIG. 24) on the counter substrate 111. The TFT substrate 101 and the counter substrate 111 are held together with a sealing resin to prepare a liquid crystal cell.

As is shown in part (b) of FIG. 25, the outer surface of the counter electrode 111 is coated with a negative photosensitive resin layer 115. The resultant liquid crystal cell is exposed to light from the side of the TFT substrate 101 using the black matrix 110 as a mask to pattern the negative photosensitive resin layer 115.

Then, a mixture 117 of 0.1 g of R-684 (produced by Nippon Kayaku Co., Ltd.), 0.05 g of styrene, 0.85 g of isobornyl methacrylate, 4 g of a liquid crystal material ZLI-4792 (including 0.4 wt % of S-811; produced by E. Merck & Co., Inc.), and 0.0025 g of Irugacure 651 as a photo-initiator is injected into the resultant liquid crystal cell in a transparent state (at a temperature of 35° C.).

As is shown in part (c) of FIG. 25, an ultraviolet rays are radiated to the liquid crystal cell at the same temperature. In detail, a high pressure mercury lamp for emitting collimated light is used as an optical source for radiating the ultraviolet rays. The light is radiated on the liquid crystal cell from the side of the photosensitive resin layer 115. The liquid crystal cell is placed below the mercury lamp at a position where a light intensity of 10 $mW/cm^2$ is obtained. The light is radiated for one second and stopped for 30 seconds, and such a cycle is repeated 20 times. Then, the ultraviolet rays are continuously radiated for 10 minutes to cure the resin. As a result, the mixture 117 is separated into a polymer phase 118 and a liquid crystal phase 119 as is shown in part (d) of FIG. 25. The photosensitive resin layer 115 is removed by a remover to form the LCD device 130 as is shown in part (e) of FIG. 25. By examination using a polarizing microscope, liquid crystal domains included in the liquid crystal phase 119 formed in areas corresponding to the pixel electrodes 107 were confirmed.

In the ninth example, the polymer phase 118 is separated from the liquid crystal phase 119 by self-alignment of the liquid crystal molecules. Accordingly, the liquid crystal layer having the liquid crystal phase 119 in areas corresponding to the pixel electrodes 107 are easily formed by self-alignment.

Different types of alignment films are used in accordance with the usage of the LCD device. The alignment film can even be eliminated. In order to radially or randomly arrange the liquid crystal domains to improve the viewing angle characteristic of the LCD device, the following methods are mainly used.

(1) The alignment film is formed of a polymer thin material having spherulites such as nylon, polyethylene terephthalate, or polyoxymethylene.

(2) A nucleus for generating a disclination line in the liquid crystal region is located at a center of an area corresponding to the pixel.

By using these methods, the liquid crystal domains can be radially or randomly arranged without locating a polymer material at a center of an area corresponding to the pixel, and thus an LCD device realizing a high image contrast can be produced.

The present invention is applicable to an LCD device including liquid crystal used in almost all modes which can be active-driven such as TN, STN, FLC (ferroelectric liquid crystal), ECB (electrically controlled birefringence), and the mode in which the liquid crystal domains are radially or randomly arranged are surrounded by the polymer wall. The present invention is applicable both to a transmission type LCD device and a reflection type LCD device. The present invention is further applicable both to a color LCD device and an LCD device for monochrome display. For the monochrome display, for example, the black state realized by two polarizing plates having polarizing axes perpendicular to each other is utilized.

Figure 16:
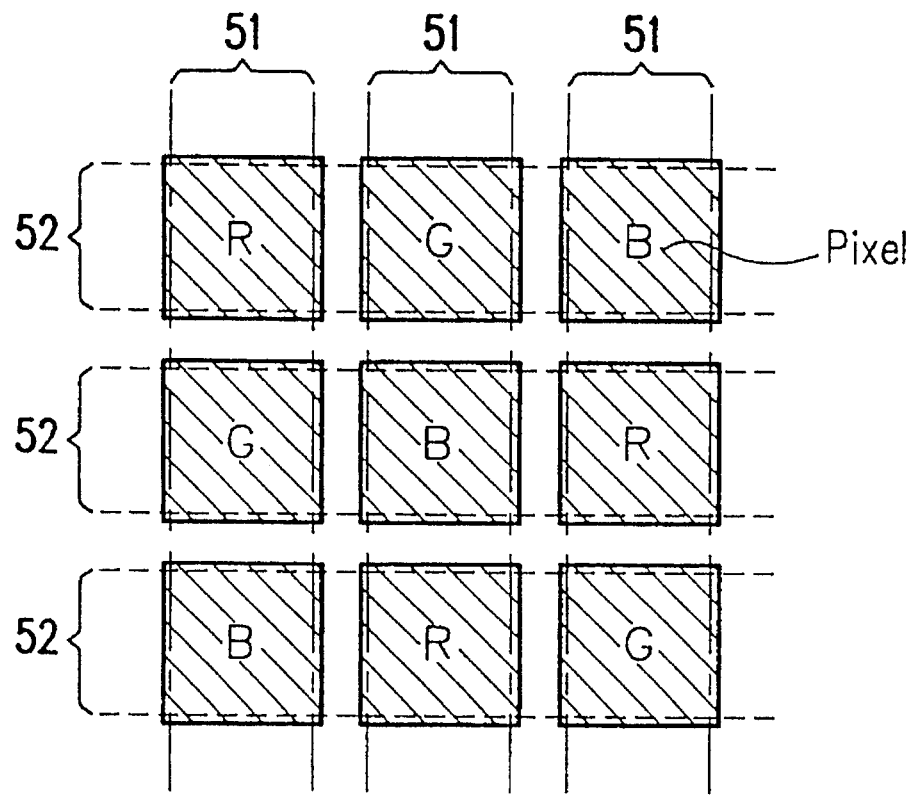
FIG. 16 is a plan view of a simple matrix LCD device according to the present invention.

The present invention is applicable to both active driving of an LCD device including an active device such as a TFT or a MIM (metal-insulator-metal) and simple matrix driving. An LCD device driven by simple matrix driving is shown in FIG. 16. The LCD device includes two substrates opposed to each other. One of the two substrates has transparent electrodes 51 as is illustrated in FIG. 16 formed thereon. The other substrate has transparent electrodes 52 crossing the transparent electrodes 51. The areas at which the transparent electrodes 51 and 52 superpose each other are pixels.

According to the present invention, the substrate is formed of, for example, a transparent solid which allows light transmission therethrough. For example, one of the two substrates may be formed of a glass or plastic film. The other substrate may be formed of a light reflecting material, for example, metal such as aluminum, tantalum or molybdenum, or a semiconductive material such as silicon or GaAs.

As has been described so far, according to the present invention, a liquid crystal region or liquid crystal phase can easily be formed by light radiation from the side of the substrate provided with a color filter or a black mask.

A layer for shielding the ultraviolet rays are included in the liquid crystal cell. Accordingly, a photomask is not necessary on the outer surface of the LCD device. Further, positional precision for light radiation is improved, and the production process is significantly simplified.

A component in the LCD device also acts as a photomask, which further simplifies the production process.

Also according to the present invention, a black matrix formed of a resin is formed on one of the substrates, and a mask pattern of a photosensitive resin is formed on the other substrate using the black matrix. By radiating light using the mask pattern, the mixture of a liquid crystal material and a polymer which is injected into the liquid crystal cell is separated into a liquid crystal phase and a polymer phase easily by self-alignment.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a pair of substrates opposed to each other;

a plurality of pixels for realizing display; and a liquid crystal layer interposed between the substrates and including a liquid crystal region corresponding to each of the pixels, the liquid crystal regions being surrounded by a polymer wall, wherein at least one of the substrates is transparent and includes thereon optical means for adjusting a transmittance of light therethrough, the optical means corresponding to each of the pixels, and the optical means has a transmittance of no greater than 50% with respect to light of at least one wavelength in the range of 250 to 400 nm and has a maximum transmittance of at least 20% with respect to light of a wavelength of more than 400 nm.

2. A liquid crystal display device according to claim 1, further comprising another optical means included in the transparent substrate having the optical means, wherein the another optical means includes a light transmitting area and a light shielding area, the light shielding area shielding at least a portion of an area of the liquid crystal display device excluding the pixels and the light transmitting area allowing light to be transmitted through the pixels and at least a portion excluding the pixels.

3. A liquid crystal display device according to claim 2, wherein the substrate opposed to the transparent substrate having the another optical means includes light shielding means for shielding light transmitted through the light transmitting area of the another optical means.

4. A liquid crystal display device according to claim 7, wherein the light shielding means includes at least one of a signal line and a scanning line.

5. A liquid crystal display device according to claim 1, wherein the optical means is a color filter.

6. A liquid crystal display device according to claim 1, further comprising a polarizing plate on a surface of at least one of the substrates, the surface being opposite to a surface facing the liquid crystal layer.

7. A liquid crystal display device according to claim 1, further comprising an alignment film on a surface of at least one of the substrates, the surface facing the liquid crystal layer.

8. A liquid crystal display device according to claim 7, wherein the alignment film includes a polycrystal.

9. A liquid crystal display device according to claim 1, wherein the optical means is formed of a polymer material which substantially allows visible light to transmit therethrough.

10. A liquid crystal display device according to claim 1, wherein the optical means is formed of a thin film including an optical portion for substantially shielding light of a wavelength range of 250 to 400 nm.

11. A liquid crystal display device according to claim 10, wherein the optical portion includes a light absorber for selectively absorbing the light of the wavelength range of 250 to 400 nm.

12. A liquid crystal display device according to claim 1, wherein the optical means is formed on a side of the transparent substrate facing the liquid crystal layer.

13. A liquid crystal display device, comprising:

a pair of substrates opposed to each other;

a plurality of pixels for realizing display; and a liquid crystal layer interposed between the substrates and including a liquid crystal region corresponding to each of the pixels, the liquid crystal regions being surrounded by a polymer wall, wherein the liquid crystal region includes at least one liquid crystal domain having liquid crystal molecules radially arranged, and one of the substrates includes light shielding means in an area excluding the pixels, and areas on the other substrate corresponding to the pixels are transparent.

14. A liquid crystal display device according to claim 13, wherein the light shielding means is formed of a resin material including a spacer mixed therein.

15. A liquid crystal display device according to claim 13, wherein the light shielding means is formed of a resin material including a black filler mixed therein.

16. A liquid crystal display device according to claim 13, further comprising a switching device for adjusting the display realized by the pixels.

17. A method for producing a liquid crystal display device including:

two substrates opposed to each other, at least one of which is transparent;

a plurality of pixels for realizing display; and a liquid crystal layer interposed between the substrates and including a liquid crystal region corresponding to each of the pixels, the liquid crystal regions being surrounded by a polymer wall, the method comprising the steps of:

forming, on a surface of the transparent substrate, optical means for adjusting a transmittance of light therethrough, the optical means having a transmittance of no greater than 50% with respect to light of at least one wavelength in the range of 250 to 400 nm and a maximum transmittance of at least 20% with respect to light of a wavelength of more than 400 nm;

assembling the two substrates together, with the surface of the substrate provided with the optical means being inside;

injecting a mixture of a liquid crystal material and a photocurable resin between the two substrates to form the liquid crystal layer; and radiating light of the at least one wavelength toward the assembly of the two substrates including the liquid crystal layer from the side of the transparent substrate provided with the optical means, thereby forming a liquid crystal region corresponding to each of the pixels surrounded by the polymer wall in the liquid crystal layer.

18. A method for producing a liquid crystal display device according to claim 17, wherein the optical means includes a light absorber.

19. A method for producing a liquid crystal display device according to claim 17, further comprising the step of forming on the surface of the transparent substrate having the optical means another optical means wherein the another optical means includes a light transmitting area and a light shielding area, the light shielding area shielding at least a portion of an area of the liquid crystal display device excluding the pixels and the light transmitting area allowing light to be transmitted through the pixels and at least a portion excluding the pixels.

20. A method for producing a liquid crystal display device according to claim 19, further including the step of forming on the substrate opposed to the transparent substrate a light shielding means for shielding light transmitted through the light transmitting area of the another optical means.

21. A method for producing a liquid crystal display device according to claim 20 wherein the light shielding means is formed to include at least one of a signal line and a scanning line.

22. A method for producing a liquid crystal display device including:

two substrates opposed to each other, at least one of which is transparent;

a plurality of pixels for realizing display; and a liquid crystal layer interposed between the substrates and including a liquid crystal region corresponding to each of the pixels, the liquid crystal regions being surrounded by a polymer wall, the method comprising the steps of:

forming, on a surface of the transparent substrate, optical means for adjusting a transmittance of light therethrough in a pattern, the optical means having a transmittance of no greater than 50% with respect to light of at least one wavelength in the range of 250 to 400 nm and a maximum transmittance of at least 20% with respect to light of a wavelength of more than 400 nm;

forming a photosensitive resin layer on a surface of the substrate excluding the optical means;

assembling the two substrates together, with the surface of the substrate provided with the optical means and the surface of the substrate excluding the photosensitive resin layer being inside;

radiating light of the at least one wavelength toward the photosensitive resin layer from the side of the substrate including the optical means, using the optical means as a photomask to form the photosensitive resin layer into a pattern;

injecting a mixture of a liquid crystal material and a photocurable resin between the two substrates to form the liquid crystal layer; and radiating light toward the assembly of the two substrates including the liquid crystal layer from the side of the substrate including the photosensitive resin layer, thereby forming a liquid crystal region corresponding to each of the pixels surrounded by the polymer wall in the liquid crystal layer.

* * * * *